United States Patent [19]

Elko et al.

[11] Patent Number: 5,561,809
[45] Date of Patent: Oct. 1, 1996

[54] IN A MULTIPROCESSING SYSTEM HAVING A COUPLING FACILITY, COMMUNICATING MESSAGES BETWEEN THE PROCESSORS AND THE COUPLING FACILITY IN EITHER A SYNCHRONOUS OPERATION OR AN ASYNCHRONOUS OPERATION

[75] Inventors: David A. Elko; Audrey A. Helffrich; John F. Isenberg, Jr.; Brian B. Moore, all of Poughkeepsie; Jeffrey M. Nick, Fishkill; Michael D. Swanson; Joseph A. Williams, both of Poughkeepsie, all of N.Y.

[73] Assignee: International Business Machines Corporation, Armonk, N.Y.

[21] Appl. No.: 420,893

[22] Filed: Apr. 11, 1995

Related U.S. Application Data

[63] Continuation of Ser. No. 860,380, Mar. 30, 1992, abandoned.

[51] Int. Cl.⁶ .................................................. G06F 15/00
[52] U.S. Cl. ........................ 395/800; 395/475; 395/727; 395/200.08
[58] Field of Search ................................. 395/800, 650, 395/600, 425, 727, 200.08, 445

[56] References Cited

U.S. PATENT DOCUMENTS

| | | | |
|---|---|---|---|
| 4,004,277 | 1/1977 | Gavril | 395/843 |
| 4,477,881 | 10/1984 | Kobayashi et al. | 395/200.09 |
| 4,495,564 | 1/1985 | Draper et al. | 395/837 |
| 4,587,609 | 5/1986 | Boudreau et al. | 395/726 |
| 4,688,035 | 8/1987 | Gray et al. | 340/825.52 |
| 4,823,304 | 4/1989 | Frantz et al. | 395/250 |
| 4,858,116 | 8/1989 | Gillett et al. | 395/482 |
| 4,926,420 | 5/1990 | Shimizu | 370/94.1 |
| 4,965,719 | 10/1990 | Shoens et al. | 395/650 |
| 5,107,489 | 4/1992 | Brown et al. | 370/58.2 |
| 5,170,472 | 12/1992 | Cwiakala et al. | 395/828 |
| 5,179,702 | 1/1993 | Spix et al. | 395/650 |
| 5,265,235 | 11/1993 | Sindhu et al. | 395/447 |
| 5,297,262 | 3/1994 | Cox et al. | 395/311 |
| 5,345,590 | 9/1994 | Ault et al. | 395/650 |

FOREIGN PATENT DOCUMENTS

| | | | |
|---|---|---|---|
| 0348654 | 1/1990 | European Pat. Off. | G06F 13/28 |
| 0375892 | 7/1990 | European Pat. Off. | G06F 12/08 |
| 0398523 | 11/1990 | European Pat. Off. | G06F 13/12 |
| 2037037 | 7/1980 | United Kingdom | G06F 13/00 |

OTHER PUBLICATIONS

Hamacher et al., *Computer Organization*, 1990, pp. 402–409 and 461–483.

*Primary Examiner*—Alyssa H. Bowler
*Assistant Examiner*—John Follansbee
*Attorney, Agent, or Firm*—Floyd A. Gonzalez

[57] ABSTRACT

A mechanism for communicating messages, each including a command and a response, in a network having central processing complexes (CPCs) and one or more coupling facilities. Each coupling facility has a central processor for executing instructions and a main storage. Messages are sent from a message control block in the main storage of the CPC sending the message, and the response to the message is received in a message response block of the CPC without an interrupt to the program being executed by the central processor of the CPC. Each message from a CPC to the coupling facility may include a command and an indicator bit which instructs the coupling facility to execute the command either in synchronism with or asynchronously to the execution of the sending processor. The coupling facility executes the command and returns a response which is received in a message response block of the main storage of the sending CPC without an interrupt to any program being executed by the central processor of that CPC.

55 Claims, 12 Drawing Sheets

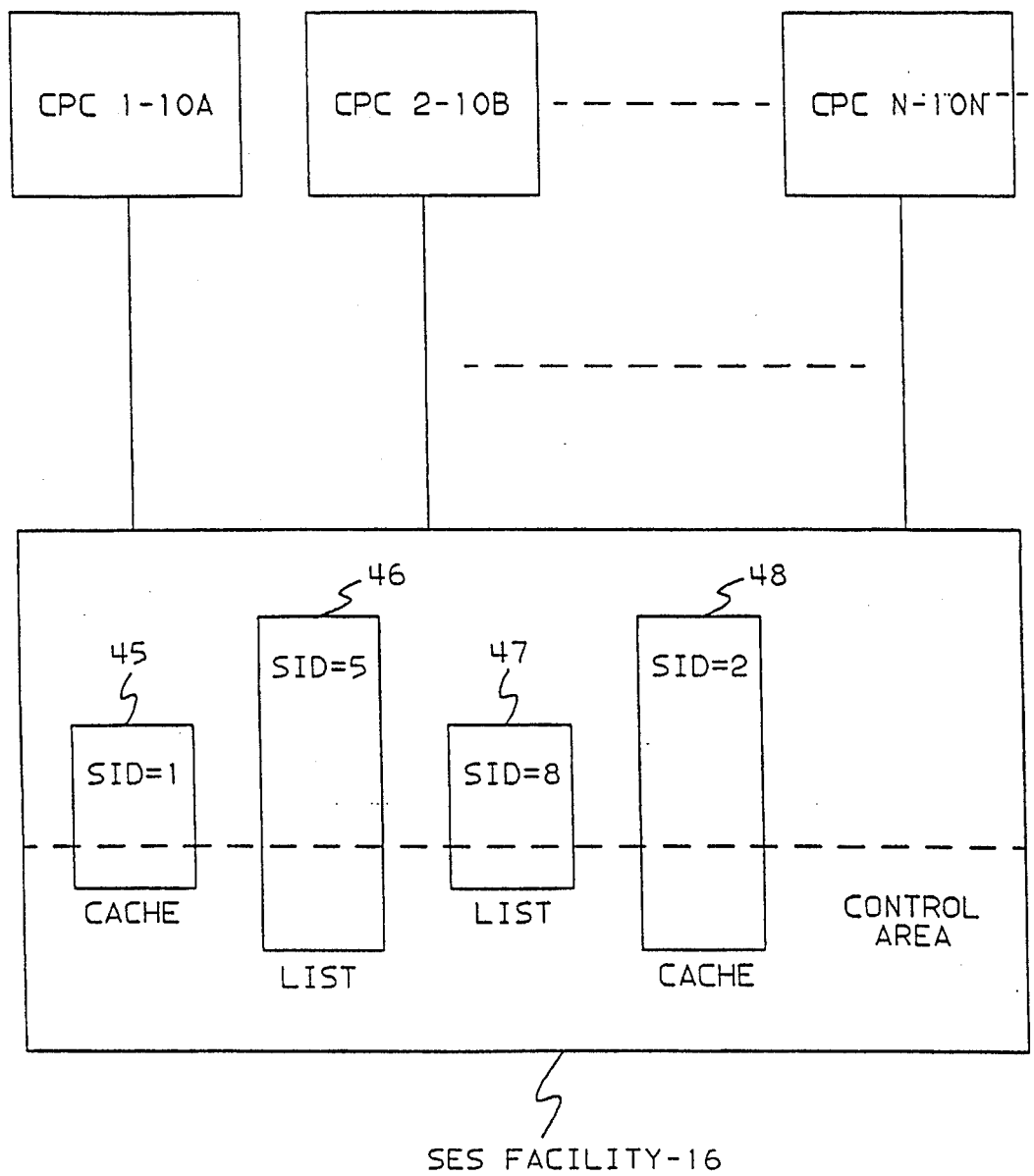

FIG. 5

LOCAL CACHE OF SYSTEM 1 - 24A

| NAME 50A | DATA 52A | DATA 53A | STATE 54A |
|---|---|---|---|
| A | DATA | ADJ | VALID |
| C | DATA | ADJ | VALID |
| L | | | INVALID |
| X | DATA | ADJ | VALID |

LOCAL CACHE OF SYSTEM 2 - 24B

| NAME 50B | DATA 52B | DATA 53B | STATE 54B |
|---|---|---|---|
| C | DATA | ADJ | VALID |
| B | DATA | ADJ | VALID |
| | | | INVALID |
| X | DATA | ADJ | VALID |

SES FACILITY-16

CACHE STRUCTURE-26

NAME (L)

DIRECTORY 60

| NAME 51 | STATE 61 | REG 62 |
|---|---|---|
| A | | |
| B | | |
| C | | |
| ⋮ | ⋮ | ⋮ |
| X | | |

DATA TABLE 55

| 56 | 57 |
|---|---|
| DATA AREA 1 | ADJ AREA 1 |
| DATA AREA 2 | ADJ AREA 2 |
| DATA AREA 3 | ADJ AREA 3 |
| ⋮ | ⋮ |
| DATA AREA M | ADJ AREA M |

DASD-40

NAMED DATA BLOCKS

FIG. 7

| FIELD NAME |
|---|
| ASYNCHRONOUS OPERATION (A) |
| NOTIFICATION (N) |
| LOGICAL-PATH MASK (LPM) |
| COMMAND LENGTH |
| AUTHORIZATION INDEX (AX) |
| MBAL ADDRESS |
| MBAL LENGTH |
| MESSAGE-BUFFER LENGTH |
| MESSAGE-COMMAND-BLOCK ADDRESS |
| LIST-NOTIFICATION TOKEN |
| LIST-NOTIFICATION ENTRY NUMBER (LNEN) |

FIG. 8

| FIELD NAME |
|---|
| COMMAND CODE |
| WRITE (W) INDICATOR |
| COMMAND INFORMATION |

IN A MULTIPROCESSING SYSTEM HAVING A COUPLING FACILITY, COMMUNICATING MESSAGES BETWEEN THE PROCESSORS AND THE COUPLING FACILITY IN EITHER A SYNCHRONOUS OPERATION OR AN ASYNCHRONOUS OPERATION

This application is a continuation of application Ser. No. 07/860,380, filed Mar. 30, 1992, now abandoned.

BACKGROUND OF THE INVENTION

The present invention relates to a mechanism for communicating messages, each including a command and a response, in a network having a coupling facility and multiple central processing complexes (CPCs), each CPC having a central processor and main storage and more particularly relates to a mechanism in which a command issued by the central processor of a CPC is executed by the coupling facility either synchronously or asynchronously to the CPU under program control, wherein the command requests operands from main storage, operates on storage objects at the coupling facility, and stores response operands in main storage.

I/O operations normally require more time to complete than it takes for the operating system to exchange state information and switch to another task. Thus I/O operations are performed asynchronously to CPU instruction processing. On the other hand, the message operations of the present invention are designed to be performed in less time than it takes to switch tasks. Thus, system overhead is reduced by performing them synchronously to CPU instruction processing. Another benefit of synchronous operation is that CPC cache castouts resulting from task switching are eliminated. Still a third benefit is reduced programming costs for accessing the message functions.

While system efficiency is improved by performing many message operations synchronously to CPU instruction processing, other message operations should still be performed asynchronously. For example, an operation that clears a storage location in shared expanded storage does not require suspending the requesting transaction pending its completion. In addition, no completion indication is required by the transaction. Thus, instruction processing for the transaction can continue while, at the same time, the clearing operation is performed at shared expanded storage.

SUMMARY OF THE INVENTION

Coupling commands are issued by CPUs, but they are executed by coupling facilities which communicate with the CPUs using optical links. A command takes request operands from main storage, operates on storage objects at the coupling facility, and stores response operands in main storage. A communication encompassing a command and the associated response is called a message. The invention provides a message mechanism for coupling facilities.

It is a primary object of the present invention to provide for establishing a synchronous mode of execution for message operations.

It is another object of the present invention for establishing, under program control, whether a message operation is to be performed synchronously or asynchronously with CPU instruction processing.

It is another object of the present invention to provide for establishing a mode of execution of the message operation, whether performed asynchronously or synchronously to CPU instruction processing, whereby the operation does not generate an I/O interruption.

It is another object of the present invention to provide for indicating to the program at the completion of a synchronous message operation, whether or not status is pending at the subchannel.

It is another object of the present invention to provide for testing for the completion of the message operation without requiring a serialization or checkpoint synchronization operation.

It is another object of the present invention to provide for terminating a synchronous message operation and indicating the failure condition to the program when a failure in the transport facilities or the coupling facility interrupts the normal performance of the operation.

It is another object of the present invention to provide for completion of a message operation which is performed without an interrupt or subchannel usage.

It is another object of the present invention to provide for a subchannel whose status is withdrawn allowing for the reuse of the subchannel without an interrupt having been generated.

It is another object of the present invention to provide for a new type of subchannel which is different from an I/O subchannel.

It is another object of the present invention to provide for a new type of message path which is different from an I/O path.

These and other objects of the present invention will be apparent from the following more particular description of the preferred embodiment of the invention as illustrated in the drawings.

BRIEF DESCRIPTION OF THE DRAWINGS

FIG. 4 is another portion of the system of FIG. 1 and shows multiple structures in a SES facility;

FIG. 5 shows the three-level storage hierarchy of the system of FIG. 1;

FIG. 7 is the format of a message-operation block (MOB) which is the operand of the instruction of a SEND MESSAGE (SMSG) instruction;

FIG. 8 is the format of a message-command block (MCB);

DESCRIPTION OF A PREFERRED EMBODIMENT

Figure 1:
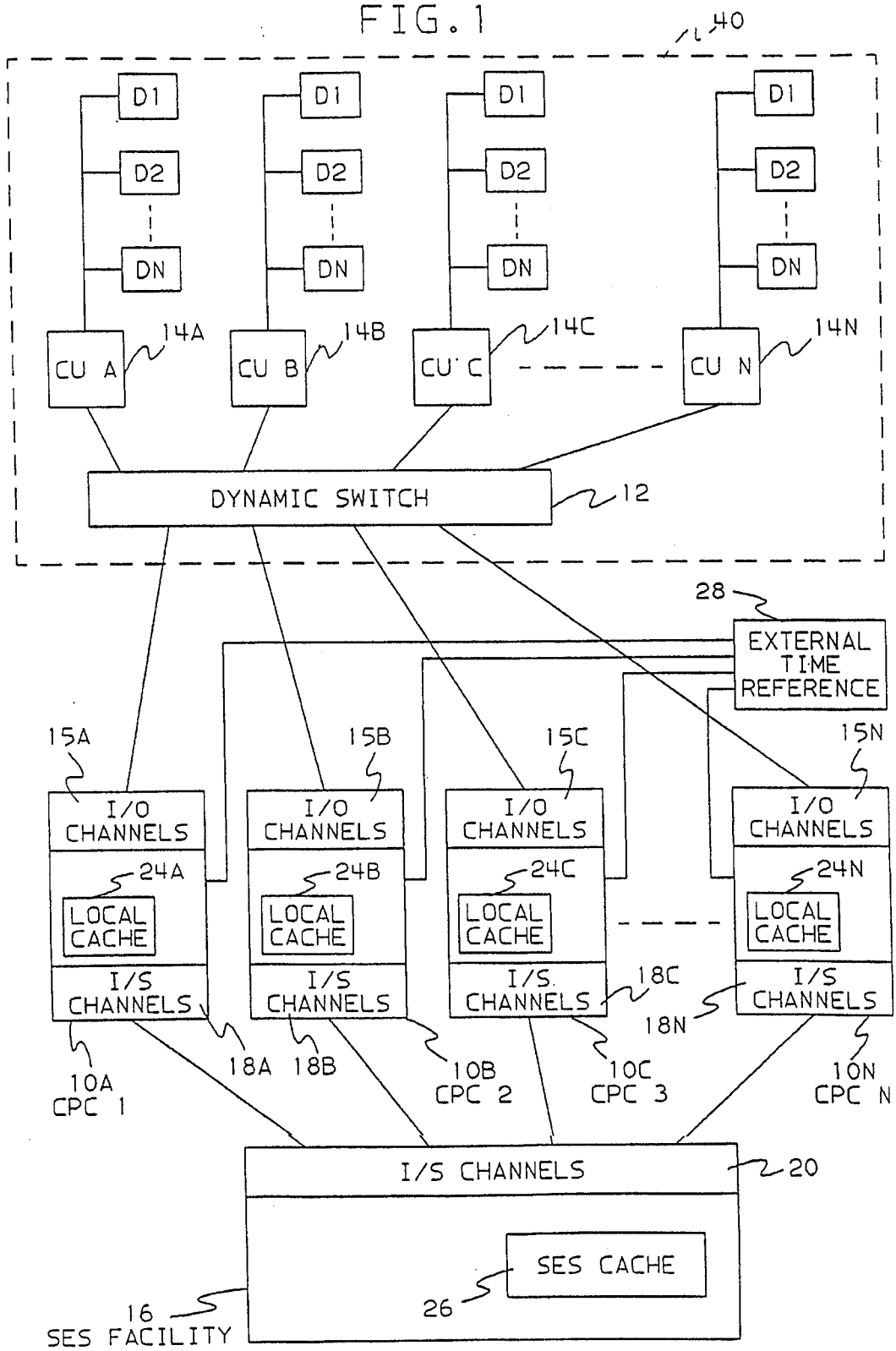
FIG. 1 is a block diagram of a data processing system of the present invention having multiple CPCs connected to an I/O system and a SES facility.

FIG. 1 is a block diagram of a data processing system using the present invention. The system of FIG. 1 includes multiple central processing complexes (CPCs) 10A through 10N which are connected to an input/output (I/O) system including a dynamic switch 12 controlling access to multiple I/O control units 14A through 14N. Each of the control units 14A through 14N controls one or more direct access storage devices (DASD) D1 through DN as shown. The dynamic switch 12 may be an ESCON Director dynamic switch available from IBM Corporation, Armonk, N.Y. Such a dynamic switch is disclosed in U.S. Pat. No. 5,107,489 for Switch and its Protocol for making Dynamic Connections issued Apr. 21, 1992 and assigned to the owner of the present invention, which patent is incorporated herein by reference. As is known, I/O commands and data are sent from a CPC to an I/O control unit through the dynamic switch 12 by means of I/O channels 15A through 15N of the respective CPCs 10A through 10N. Channel programs for a particular I/O channel are established by channel command words (CCWs) as is well known in the art.

Each of the CPCs 10A–10N are connected to a structured-external-storage (SES) facility 16, which contains storage accessible by the CPCs and which performs operations requested by programs in the CPCs. Each CPC 10A–10N contains intersystem (I/S) channels 18A–18N, respectively, which are connected to I/S channels 20 in the SES facility 16. The SES facility 16 is also referred to herein as a coupling facility. Even though only one SES facility 16 is shown in the embodiment of FIG. 1, it will be understood that multiple SES facilities may be provided for, each with its own I/S channels and message paths connected to all or some subset for the CPCs 10A–10N. It will be understood that the I/O channels 15 are part of the well known channel subsystem (CSS), which CSS also includes the I/S channels 18 disclosed herein, even though channels 15 and 18 are shown separately in FIG. 1 for convenience.

Each of the CPCs 10A–10N has a local cache 24A–24N, respectively, and the SES facility 16 contains one or more SES caches 26. The DASD devices D (referred to herein collectively as DASD 40), the local caches 24A–24N and the SES cache 26 form a three-level storage hierarchy. The lowest level of storage is the DASD 40, the intermediate level of storage is the SES cache 26, and the highest level is the local caches 24A–24N. The local caches 24A–24N are many times referred to herein as the local cache 24.

Each of the CPCs 10A–10N may be an IBM system following the Enterprise Systems Architecture/390 Principles of Operation as described in IBM publication SA22-7201-00. Each of the CPCs 10A–10N includes one or more central processing units (CPUs) which executes an operating system, such as IBM's MVS operation system, for controlling execution of programs for processing data, as is well known. One such program performs many of the SES operations mentioned herein. This program is referred to herein as "the program." Individual instructions of the program are identified as "CPU instructions."

An external time reference (ETR) 28 provides time stamps of control information to be written into a log to document recovery from failures, backing out of undesired operations, and for audit trails. The ETR 28 synchronizes the time clocks (not shown) of the CPCs 10A–10N to a precision equal to or less than the duration of the shortest externally visible operation, and uses fiber optic interconnect cables. The ETR 28 provides for cable length propagation time differences where those differences are important in order to be able to maintain synchronization to within the length of the mentioned external operation.

Figure 2:
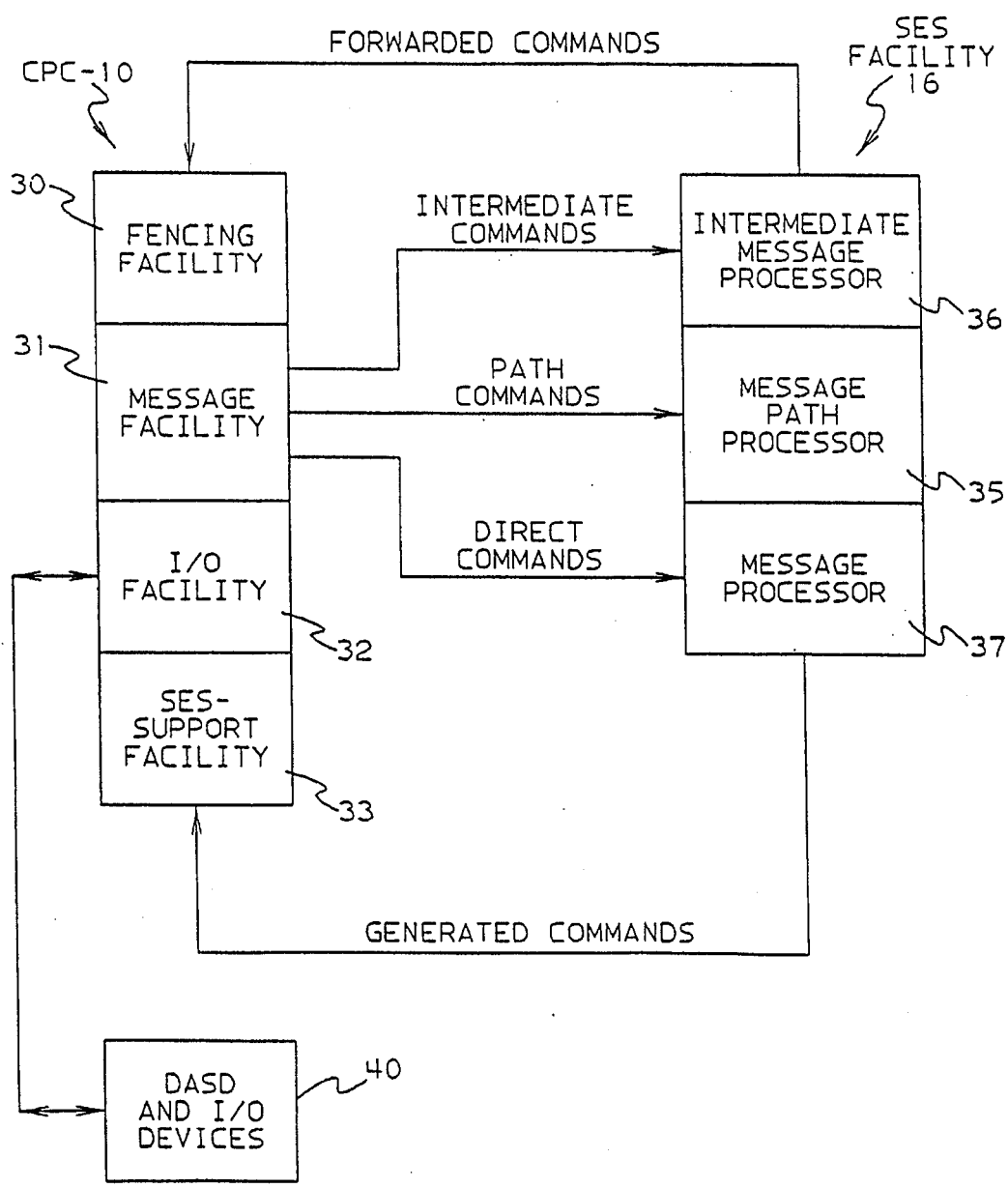
FIG. 2 is a portion of the system of FIG. 1 and shows several facilities of a single CPC connected to processors of the SES facility.

FIG. 2 shows a single CPC 10 connected to the SES facility 16. The CPC 10 includes a fencing facility 30, a message facility 31, an I/O facility 32 and a SES-support facility 33. The SES facility 16 includes a message-path processor 35, an intermediate-message processor 36, and a message processor 37. The message-path processor 35 executes message-path commands and performs message-path functions. The intermediate-message processor 36 forwards intermediate message commands to remote message processors such as the fencing facility 30. The message processor 37 supports structured storage of the list and cache type, to be explained herein in connection with FIG. 4.

Figure 3:
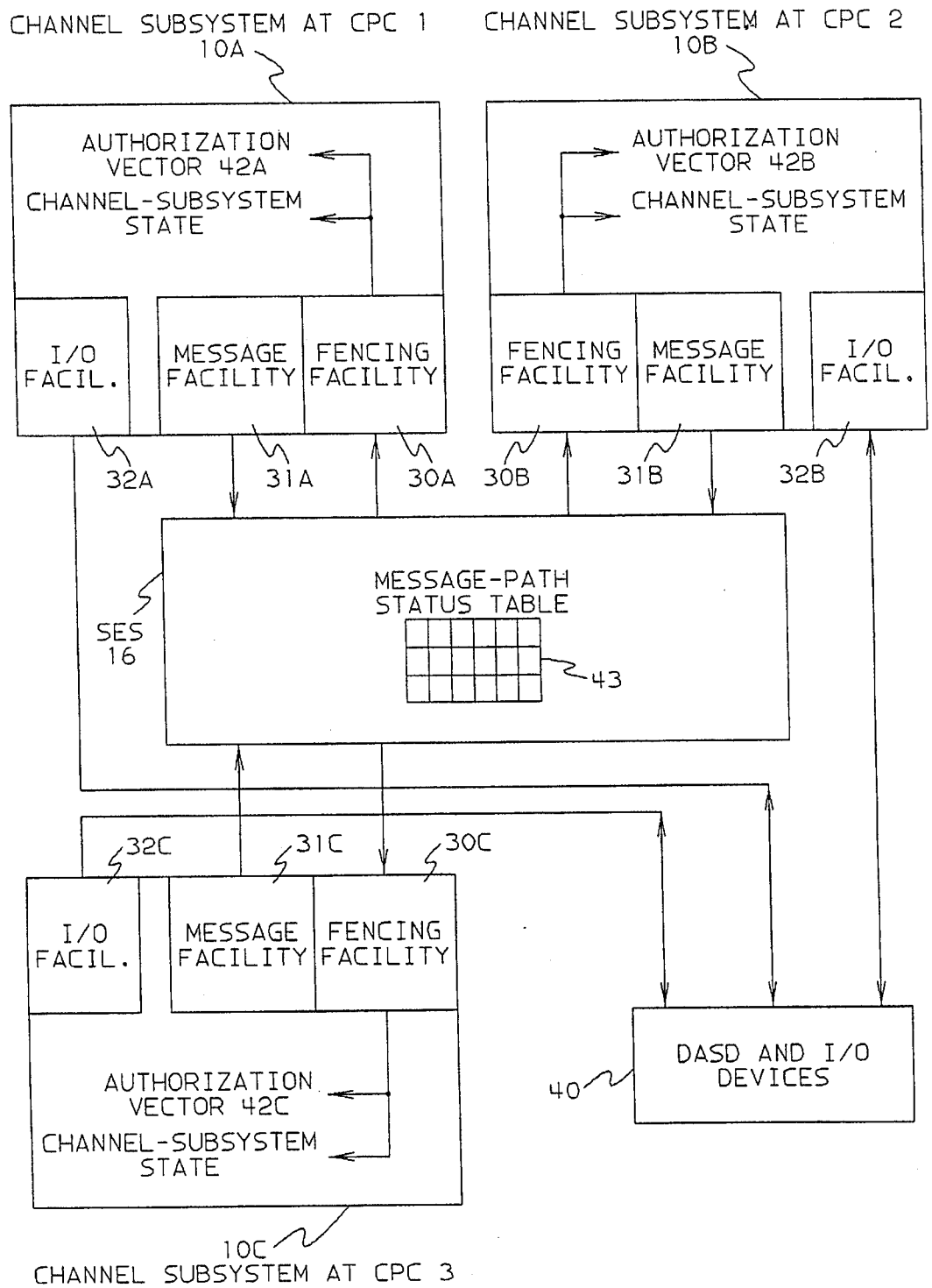
FIG. 3 is another portion of the system of FIG. 1 and shows an intermediate message processor of the SES facility and three CPCs.

The I/O facility 32 performs I/O operations and executes channel programs with DASD and I/O devices represented in FIGS. 2 and 3 at 40. The START SUBCHANNEL instruction is used to initiate an I/O operation in a manner well known in the art. The I/O facility is described the aforementioned ESA/390 Principles of Operation.

The message facility 31 performs message operations with the SES processors 35, 36 and 37, and with the fencing facilities 30. The SEND MESSAGE instruction is used to initiate a message operation with a SES facility 16 or fencing facility 30, as will be discussed herein.

The fencing facility 30 executes commands that are received from other message facilities via the intermediate message processor. The commands are often issued by programs running on other CPCs. The commands operate on an authorization vector and a channel-subsystem-state indication, to be explained.

The SES-support facility 33 performs SES functions in the CPC 10 and executes commands generated by the message processor 37 in the SES facility 16.

Five separate types of message commands are defined and communicated between the hardware components of the SES facility 16 and the CPC 10. Path commands are communicated from the message facility 31 to the message path processor 35 via the SEND MESSAGE instruction over a selected message path associated with the subchannel. Path selection is performed by the control program of the CPC 10. Three path commands are defined: identify message path, activate message path and deactivate message path.

The program uses the SEND MESSAGE (SMSG) instruction to initiate an operation by the message processor 37 of FIG. 2. Execution of the message-processor operation is accomplished by sending command information to the SES facility 16 and returning response information summarizing the result. Additionally, the command may specify the transfer of data from main storage to SES storage, a SES-write operation, or the transfer of data from SES storage to main storage, a SES-read operation.

Direct commands are communicated from the message facility 31 to the message processor 37 via the SEND MESSAGE instruction over a selected message path associated with the subchannel. Path selection is performed by the channel subsystem or CPU and the direct command must be communicated on an active message path. The direct command may also include a data transfer operation. Direct commands are not forwarded, but may generate one or more commands. The classes of direct commands include: global commands, retry-buffer commands, cache-structure commands, and list-structure commands.

Generated commands are communicated from the message processor 37 to the SES-support facility 33 in a designated CPC over a message path selected by the message processor 37 from the path group for the system. The SES support facility comprises a processor for execution of the generated commands communicated over a message path. Path selection is performed by the message-path processor 35. No data transfer occurs. Generated commands must be communicated on an active message path. The generated commands include the cross-invalidate and list-notification commands, to be explained. Depending on the command, processing of the generated commands may or may not complete prior to completion of the associated direct command. However, a direct command does not complete before the action intended by the generated command is assured.

Intermediate commands are communicated for the message facility 31 to the intermediate-message processor 36 via the SEND MESSAGE instruction over a selected message path associated with the subchannel. Path selection is performed by the channel subsystem or CPU. Intermediate fencing commands are forwarded to the fencing facility 30 in a designated CPC.

Forwarded commands are communicated from the intermediate message processor 36 to a message processor. Path selection is performed by the message-path processor 35. Forwarded commands must be communicated on an active message path. Exactly one forwarded command is processed for each intermediate command that is received at the intermediate message processor 36. Processing of the forwarded command must complete prior to completion of the associated intermediate command.

Command execution characteristics at the SES facility 16 are disclosed in U.S. Pat. No. 5,317,739 issued May 31, 1994 for "Method and Apparatus for Coupling Data Processing Systems" D. A. Elko et al., incorporated herein by reference.

All communications to a SES facility 16 from the CPC 10 may use the same message path, depending on the configuration, regardless of whether the destination is the message processor 37, message-path processor 35, or intermediate-message processor 36. All communications from the SES facility 16 to a CPC 10 may also use the same set of message paths, depending on the configuration, regardless of whether the destination is the fencing facility 30 or the SES-support facility 33.

The fencing facility 30 is a component of the ESA/390 channel subsystem. Fencing commands are issued by CPU programs, but they are executed by fencing facilities. Command execution involves fetching request operands from main storage, operating on storage objects at the fencing facility, and storing response operands in main storage.

Eight mechanisms exist for message paths: identification, activation, testing, deactivation, delivery of cross-invalidate or list notification commands, direct commands, responses and delivery of fencing commands.

Message-path identification and activation is performed by the CPU program to allow for selective configuration of links for communicating commands. Testing is performed for subsequent commands that are delivered on the message paths with execution permitted only for active paths. When an interface control check is presented for a command and it is discovered that a path is no longer operational, the path is inactive at the SES facility 16 and the non-operational path is deactivated by the program over an alternate path. Selection and operations of message paths is disclosed in U.S. patent application Ser. No. 07/860,800 filed Mar. 30, 1992 for Means for Ensuring Integrity of State Information of Shared Data at a Local Complex after a link Error; U.S. patent application Ser. No. 07/860,797 filed Mar. 30, 1992 for "Management of Data Objects Used to Maintain State Information for Shared Data at a Local Complex" by J. A. Frey et al (Attorney Docket No. PO9-92-004); and U.S. patent application Ser. No. 07/860,647 filed Mar. 30, 1992 for "Recovery of Data Objects Used to Maintain State Information for Shared Data at a Local Complex" by J. A. Frey et al (Attorney Docket No. PO9-92-005), all incorporated herein by reference.

Cache cross invalidation is performed by the SES facility 16 when, for instance, a write operation is executed for data in a SES cache 26 that is registered in one or more local caches 24A–24N. Before completing the SES write operation, the SES facility 16 sends a cross-invalidate signal to each system that contains a valid copy of the data in a local cache 24A–24N in order to maintain coherency of the local caches 24A–24N via a selected message path. This is disclosed in U.S. patent application Ser. No. 07/860,805 filed Mar. 30, 1992 for "Sysplex Shared Data Coherency Method and Means" by Elko et al (Attorney Docket No. PO9-91-052), incorporated herein by reference.

Notification of list-state transition is performed by the SES facility 16 when a list operation is executed that causes a list which was empty to become not empty or that causes a list (to be discussed in connection with FIGS. 4 and 6) which was not empty to become empty. In either case, a list-notification command is sent to each system that is monitoring the list, informing the system of the state transition. This is disclosed in U.S. patent application Ser. No. 07/860,809 filed Mar. 30, 1992 for "Method and Apparatus for Notification of State Transitions for Shared Lists of Data Entries" by J. A. Frey et al. (Attorney Docket No. PO9-92-007, incorporated herein by reference.

A fencing command, isolate or isolate using index, is issued by a program running on one CPC and is targeted to a system image located on a target CPC. Execution of the fencing command on the target CPC results in the isolation of the target system, or of a subsystem running on the target system, from resources shared by systems in a sysplex, that is, a system having multiple CPCs. This is disclosed in U.S. patent application Ser. No. 07/860,489 filed Mar. 30, 1992 for "Interdicting I/O and Messaging Operations in a Multi-system Complex" by D. A. Elko et al (Attorney Docket No. PO9-92-010), incorporated herein by reference. Fencing commands are routed to the target by sending the command to the SES facility 16, which forwards the command to the target system image.

The SES facility 16 continuously monitors the state of the physical links used to communicate commands by a message-path status table 43 of FIG. 3. Any failure, temporary or permanent, that may result in the loss of or change in the physical connection causes all the message paths associated with the physical link, as recorded in the message-path status table 43, to be placed in the inactive state. Commands are not sent on these links until the program has renegotiated the connections and reactivated the message paths. This prevents improper connections, such as from movement of cables, from causing commands to be incorrectly routed.

In addition to the SES monitoring function, the program may intentionally deactivate paths or change the associated system identifier. The SES facility 16 serializes these routing configuration changes against delivering new cross-invalidate, list notification or system fencing commands while the renegotiation is in progress.

The path-selection mechanism provided by the message path processor 35 is common to all forwarded and generated commands. The program negotiates the configuration and maintains the routing information independent of the specific command architectures. The command architectures interface with the path-selection mechanism by various means, including attach processing by the cache-structure and list-structure commands and command forwarding by fencing.

Fencing commands are sent from a message facility to the fencing facility by using an intermediate message processor in the SES facility 16 which forwards the command. The use of the intermediate message processor 36 avoids the need for direct connections among the CPCs in a sysplex.

FIG. 3 shows three CPCs and of the SES facility 16.

When a fencing command is received at the intermediate message processor, it is forwarded to the fencing facility 30. The path-selection function in the message-path processor 35 is invoked by the intermediate message processor 36 to deliver the fencing command to the specified system.

FIG. 4 shows a SES facility 16 having multiple structures 45–48. The message processor 37 provides the program with separate storage structures. Among these are the list structure (for example 46 and 47) and cache structure (for example 45 and 48). A set of commands is provided for each structure type, as well as additional commands for referencing global objects, to be discussed. The creation, deletion and attributes of a particular structure are controlled by the program through allocation and deallocation commands. FIG. 4 shows multiple structures of the same type which may exist concurrently. The allocated structures 45–48 reside in separate SES storage locations and are located by a structure identifier (SID). The SID value provides an identification of a target structure by a command. A command of a particular structure type, such as a cache-structure or list-structure command, may only address or alter the contents of a single structure of the given type.

SES storage contains data objects and control objects. The data objects may reside in any storage location, whereas the control objects are generally restricted to the control area.

Figure 6:
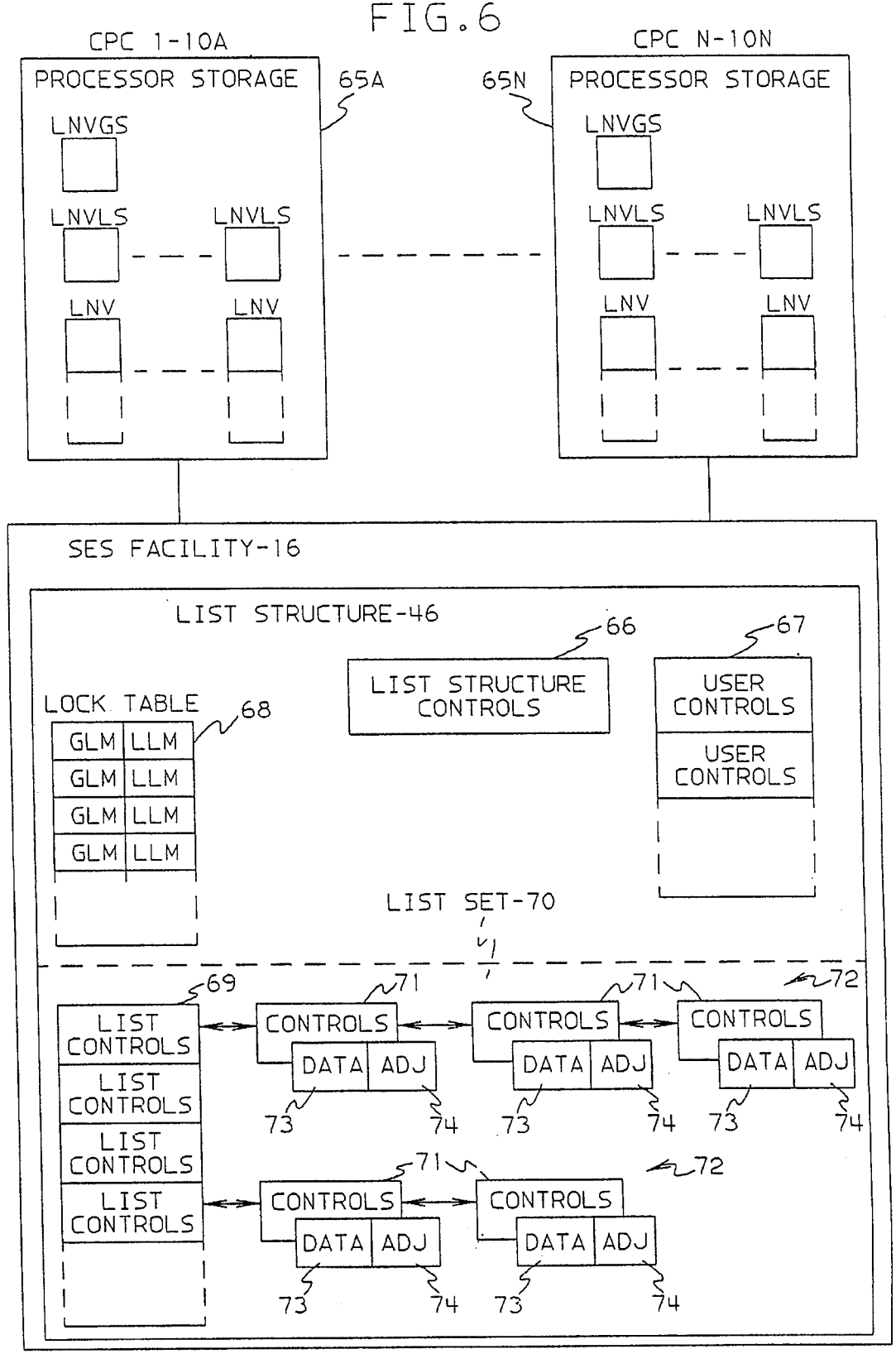
FIG. 6 illustrates one of the list structures of the structures shown in FIG. 4.

The partitioning of the SES storage and control area into structures as shown in FIGS. 4, 5 and 6 is managed by the program. The data objects are organized in tables or lists with an optional adjunct data area. The remaining objects are controls. The relative amounts of storage assigned to data and control objects are determined by program-specified parameters in the allocation commands. One of the cache structures 46 and 48 of FIG. 4 is shown as the SES cache 26 of FIG. 1.

As previously mentioned, each SES cache 26 of FIG. 1 is a component of a three-level storage hierarchy in a network of attached processors 10A–10N. FIG. 5 shows this hierarchy of storage. The lowest level of the hierarchy is DASD 40, the intermediate level is the SES cache 26, and the highest level is the local cache in processor storage. The DASD 40 and SES cache 26 are shared by the processors 10A–10N and are accessed by I/O operations and message operations, respectively. A local cache 24 is defined in each processor 10 and is accessed using CPU instructions.

As discussed in connection with FIG. 1, the processors 10A–10N are connected to the DASD 40 by I/O channels 15A–15N, and to the SES cache 26 by intersystem channels 18A–18N.

Referring to FIG. 5, data that moves through the storage hierarchy is given a name (columns 50A and 50B in the local caches 24A and 24B respectively, and column 51 in the SES cache 26). Data areas in the local caches 24A and 24B are shown in columns 52A and 52B, respectively, and optional adjunct data areas in the local caches 24A and 24B are shown in columns 53A and 53B, respectively. Each entry in the local caches 24A and 24B includes a state indicator shown in columns 54A and 54B, respectively. Each SES cache 26 may include a data table 55 which includes data areas (column 56) and adjunct data areas (column 57). The data sizes are variable with the range of variability being, in one embodiment, between 1 and n times the data-area element size. The data-area element sizes are fixed for each SES cache 26 and are powers of 2 with a minimum size of 256 bytes. An optional field of adjunct data may be associated with the data (columns 53A, 53B and 57). The names of the data (columns 50A, 50B and 51) are 16-byte values assigned by a programming protocol. The data is permanently resident in the DASD storage 40.

Copies or new versions of the data may also reside in any combination of SES-cache storage 26 and/or local-cache storage 24A and 24B. For instance, a data object may reside in SES-cache storage 26 and a subset of local caches 24A–24N, or it may reside in a subset of local caches 24A–24N but not in the SES-cache storage 26.

Each local cache 24A–24N is a processor storage area maintained by the program by utilizing the respective SES-support facility 33 on the CPC containing the local cache vector defined by a DEFINE VECTOR instruction. The DEFINE VECTOR instruction initializes controls in the SES-support facility 33 and assigns a local-cache token.

Each SES cache structure 26 is a structure in the SES facility 16 consisting of a directory 60 and, optionally, a data table 55 having a collection of data-area elements in columns 56 and 57. The directory 60 includes the name column 51 previously mentioned, and a state column 61 for indicating the state of each directory entry, and a register column 62 for pointing from each entry in the directory 60 to an entry in the data table 55. Each cache structure is designated by a structure identifier SID. Each SES cache structure in the SES cache 26 is created by an allocate-cache-structure command. The command is issued by an initialization procedure within the program which determines the attributes of the SES cache structure: size and number of data-area elements, number of directory entries, number of storage classes, and number of castout classes.

A local cache 24 is attached to the SES cache 26 by the attach-local-cache command that initializes controls in the SES facility 16 and associates the local cache with a set of paths over which the SES cache 16 issues generated commands to the SES-support facility 33, as discussed in connection with FIG. 2. A local cache 24 is attached to a SES cache structure 26 so that it may participate in the storage hierarchy. Coherency of copies of the data in the local caches 24A–24N and the SES cache 26 is maintained by controls in the SES cache 26 and enforced by cross-invalidate commands issued as generated commands to the various SES-support facilities 33 in their respective CPCs 10A–10N. The building of a set of paths in the SES facility is disclosed in U.S. patent application Ser. No. 07/860,646 filed Mar. 30, 1992 for "Message Path Mechanism for Managing Connections Between Processors and a Coupling Facility" by Elko et al (Attorney Docket No. PO9-92-006), incorporated herein by reference.

The directory 60 is a collection of directory entries arranged as a fully associative array. The directory entries are partitioned into storage classes. The subset of changed directory entries is partitioned into castout classes. Whenever a named data object is placed in the higher two levels of the hierarchy (SES cache 26 and local cache 24) its state is recorded in the state column 61 and its location is recorded in the register column 62 by the SES-cache directory. State information indicates whether the data is changed, unchanged, or locked for castout, or resident in the SES-cache storage 26. Location information includes which of the local caches 24A–24N contains a copy. Certain SES-read and SES-write commands register the local-cache copy in the SES-cache directory. SES-write and SES-invalidate commands remove the registration and invalidate local copies.

When the data is located in the local cache 24, the state of the data is either valid or invalid. The valid state of local cache entries is maintained by controls in the SES-support facility 33. The data is validated by CPU instructions and invalidated by SES-write and SES-invalidate operations. The valid state of the data is tested by a CPU instruction. A valid named data object must be registered in the SES-cache directory 60 in order to maintain local cache coherency. Local-cache coherency is maintained by the invalidation process. A registered local-cache entry may test as invalid. This is referred to as overindication of the invalid state and is permitted. This is disclosed in the aforementioned U.S. patent application Ser. No. 07/860,800.

The SES-cache storage 55 is normally smaller than the DASD storage 40. Thus, periodically the changed data must be transferred from the SES cache 26 to the backing DASD 40. This process, called castout, is controlled by the program and involves the following operations:

A SES-read for castout operation is issued that sets the castout serialization and copies the data block to main storage which may or may not be put in the local cache 24.

An I/O operation is executed that copies the data block to DASD 40.

A SES-unlock castout locks operation is issued that releases the castout serialization.

Multiple castout processes may coexist for a single one of the local caches 24A–24N. Whenever data is locked for castout, an identifier for the local cache 24A–24N and an identifier for the castout process are placed in the directory 60. This is disclosed in U.S. patent application Ser. No. 07/860,806 filed Mar. 30, 1992 for "Management of Data Movement from a SES Cache to DASD" by Elko et al (Attorney Docket No. PO9-91-079), incorporated herein by reference.

The least recently used unchanged data and directory resources are reclaimed by the SES cache 26 when needed to meet new requests. The data objects are mapped into one of several storage classes by the program. Each storage class has a reclaiming vector that controls the reclaiming process. This allows the allotment of SES storage among the storage classes to be dynamically adjusted to account for changes in workload characteristics. The reclaiming vector is maintained by the program. This is disclosed by U.S. patent application Ser. No. 07/860,807 filed Mar. 30, 1992 for "Storage Element for a Shared Electronic Storage Cache" by Elko et al (Attorney Docket No. PO9-91-078), incorporated herein by reference.

FIG. 6 shows the connection of CPCs 10A–10N to the SES facility 16 wherein each CPC 10A–10N includes processor storage 65A–65N, respectively. The contents of one list structure 46 of FIG. 4 is shown in FIG. 6. It will be understood that the other list structures of the SES facility would be the same as the list structure shown in FIG. 6.

The list structure 46 comprises list-structure controls 66, user controls 67, and, optionally, a lock table 68, and/or a list set 70 with list controls 69 and list-entry controls 71.

Each lock table 68 consists of a sequence of one or more entries, which are numbered consecutively starting at zero. The list-structure type determines whether all the lock-table entries have a global-lock-manager GML object, a local-lock-managers LLM object, or both.

The list-structure controls 66 are initialized when the list structure 46 is created. The list-structure controls 66 contains attributes of the structure, such as the structure size, list-structure type, lock-table-entry count, nonzero-lock-table-entry count, lock-table-entry size, list count, list-element size, the list-set-entry count, user-identifier vector and user controls, shown separately at 67.

The user controls 67 are created and initialized when the list-structure user is attached. The user controls 67 contain a list-notification token, system identifier, user-attachment control, and user state.

The list set 70 includes one or more lists represented by list controls 69, which are numbered consecutively starting at zero.

There are list controls 69 associated with each list 72. The list controls 69 contain a list-entry count, a list-entry-count limit, a list-monitor table, a list-state-transition count, and a user list control.

Each list 72 consists of a sequence of zero or more entries. The list-structure type determines whether all the list entries in the list set 70 have a data list entry 73, an adjunct list entry 74, or both.

One of the mentioned list-entry controls 71 is associated with each entry of a list 72. The controls 71 contain list-entry-location information and other information for managing the data in the adjunct area 74.

The list commands provide a means for writing a lock-table entry: that is a command may compare global-lock managers GLM and conditionally replace a global-lock manager GLM, a local-lock manager LLM, or both the global-lock and local-lock managers GLM and LLM. The list commands also provide a means for reading an entry in the lock-table 68 or the next nonzero lock-table entry, or for clearing a lock table 68.

The list commands also provide a means for conditionally creating, reading, replacing, moving, or deleting one entry in a list 72. A number of comparisons may be requested during these processes. They include a list-number comparison, a version-number comparison, a global-lock-manager GLM comparison, or any combination of the preceding. Additionally, when global locks are compared, local locks LLM may be compared. A list entry may be moved from one list 72 to another within the same structure 46 or from one position to another within the same list 72. This is disclosed in U.S. patent application Ser. No. 07/860,655 for "Method and Apparatus for Performing Conditional Operations on Externally Shared Data" by D. A. Elko et al. (Attorney Docket No. PO9-92-008), incorporated herein by reference.

The position of a list entry in a list 72 is determined when it is created, and may be changed when any entry in the list is created, deleted or moved. A list entry or list-entry position is located within a list set 70 by means of a list-entry identifier, an optional list-entry name, or by position.

A list-entry identifier is unique to a list set 70 and is assigned by the SES facility 16. A list-entry name is unique to a list set 70 at any particular instant and is provided by the program. The position is specified by means of a list number, a direction, and an optional list-entry key.

When list-entry keys exist, the keyed list entries are ordered by key with the lowest numerical key at the leftmost position. Elements with the same key value may be located by first or last within the same key value.

When an unkeyed list entry is created or moved, the target list-entry position is always located by unkeyed position. When a keyed list entry is created or moved, the target list-entry position is always located by keyed position and first or last within the same key value.

The list commands also provide a means for synchronously writing and moving, moving and reading, or reading and deleting one entry of a list 72. More than one list entry may be deleted synchronously, and more than one data list entry 73 or adjunct list entry 74 may also be read synchronously. The data list entry 73 is always returned in the data area designated in main storage by the message-operation block. The adjunct list entry is returned in either the message-response block or the data area, depending on the command. This is disclosed in U.S. patent application Serial No. 07/860,633 filed Mar. 30, 1992 for "Apparatus and Method for List Management in a Coupled Data Processing System" by J. A. Frey et al. (Attorney Docket No. PO9-92-009), incorporated by reference.

Normally, a data list entry 73 contains application-program data, and an adjunct list entry 74 contains the control data associated with it.

List monitoring is a SES list function which is optionally requested by a list-structure user by means of the attach-list-structure-user and the register-list-monitor commands. The attach-list-structure-user command identifies to the SES, the system on which the list-structure user resides and the list-notification vector LNV associated with the user. The register-list-monitor command allows the user to begin monitoring a list. This is disclosed in the aforementioned U.S. patent application Ser. No. 07/860,809.

Each processor storage 65A–65N includes a list-notification-vector global summary LNVGS, multiple list-notification-vector local summary LNVLS entries, and multiple list-notification vectors LNVs. The list-notification vector LNV is created by the DEFINE VECTOR instruction. The sizes or the LNVs may vary among different list users. The LNV is attached to the SES list structure 46 by means of the attach-list-structure-user command. Each entry in an LNV may be associated with a list 72 in the SES list structure 46. List transitions from the empty to non-empty and non-empty to empty states are detected by periodically polling the appropriate entry in the LNV from the CPU. The TEST VECTOR ENTRY instruction is provided for this purpose.

A LNV entry is set to 1 as a result of a list transition to the empty state. It is set to 0 as a result of a list transition to the non-empty state.

For each LNV created on the CPC there exists a list-notification-vector local summary LNVLS. As a program specified option, the LNVLS is placed into the active state when any list-notification command is processed against the associated LNV indicating an empty to non-empty list transition. The LNVLS is not updated as a result of an non-empty to empty list state transition. The update of the LNVLS is specified through use of a list-notification command option. The LNVLS is tested by the TEST VECTOR SUMMARY instruction and set or reset by the SET VECTOR SUMMARY instruction.

On a CPC there exists one list-notification vector global summary LNVGS per CPC image. The LNVGS is not updated as a result of a non-empty to empty list state transition and is set when any LNVLS is set by a list-notification command. The LNVGS is tested by the TEST VECTOR SUMMARY instruction and set or reset by the SET VECTOR SUMMARY instruction.

When a user is monitoring a list, the empty to not-empty and not-empty to empty state transitions of the list result in the SES facility 16 issuing a list notification command to the system which initiated the user attachment.

The list-notification command causes the specified list-notification-vector LNV entry to be updated to reflect the empty or not-empty state of the monitored list 72. The list-notification command may also cause the specified list-notification-vector global summary LNVGS and list-notification-vector local summary LNVLS to be updated to reflect the not-empty state of the monitored list 72.

SEND MESSAGE

A message operation is initiated and controlled by information from the SEND MESSAGE instruction and a message-operation block in main storage. The operation consists of executing a command specified in a message-command block. Response information formulated during the performance of the operation is stored in a message-response block in main storage.

When SEND MESSAGE is executed, parameters from the message-operation block are passed to the CPU or channel subsystem requesting that a send function be performed with the message device associated with the specified subchannel. The send function is performed synchronously or asynchronously to SEND MESSAGE, depending on an A bit selected by the program, to be discussed in connection with FIG. 7.

The send function is performed by using information in the subchannel to find a path to the message device. Execution of a message operation is accomplished by passing command information to the device, decoding and executing the command, formulating response information indicating the result, and storing the response information in the message-response block.

Figure 13:
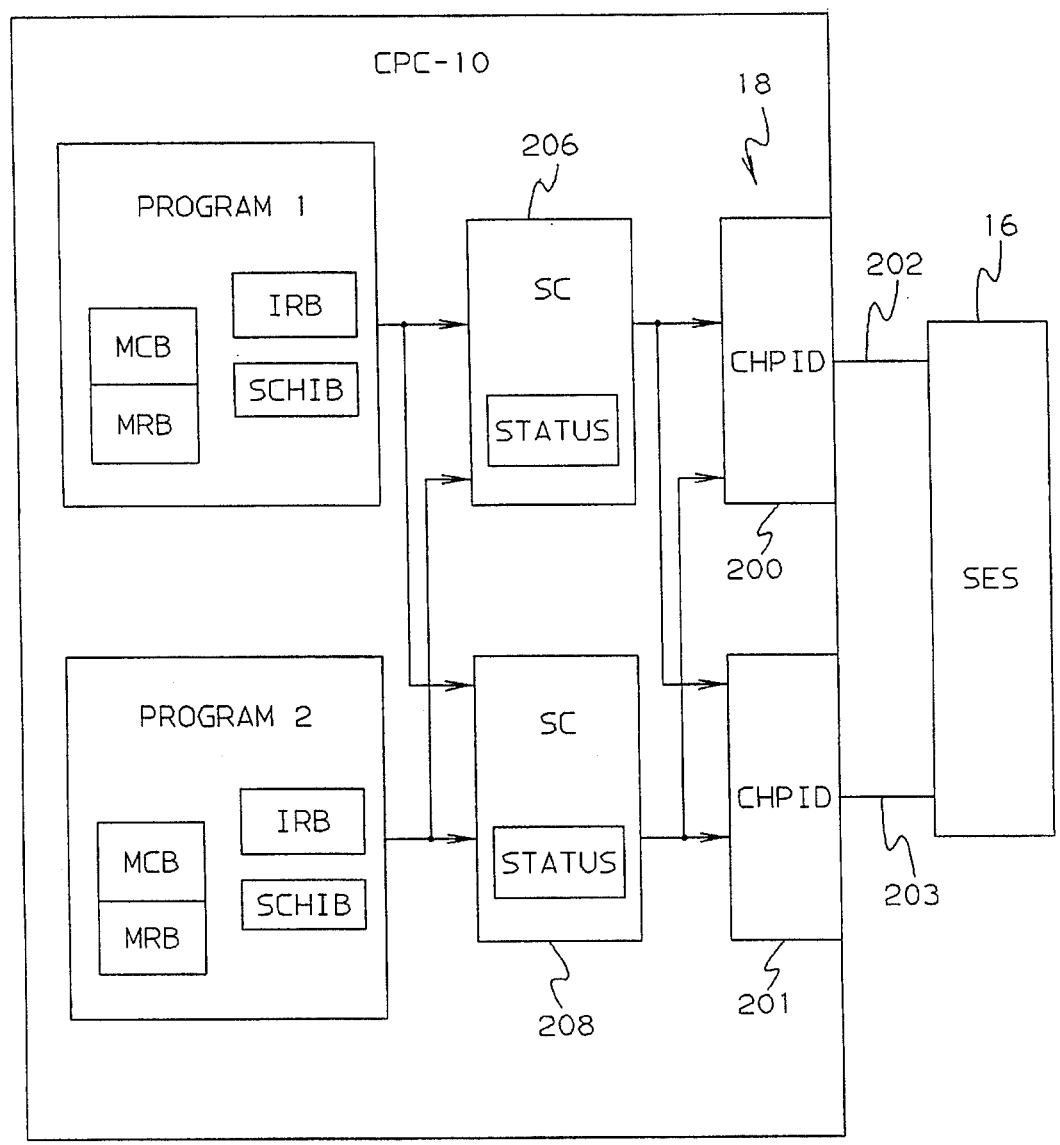
FIG. 13 is a block diagram of a portion of the CPC 10 and its connection to the SES facility of FIG. 1.

Status indications summarizing conditions detected during the execution of the send function are placed at the subchannel and made available to the program (see FIG. 13).

CPU programs initiate message operations by using the instruction SEND MESSAGE. The instruction passes the contents of a message operation block to the CPU or channel subsystem. The contents specify control parameters pertinent to the operation.

I/O-authorization facility permits the control program to regulate access to channel-subsystem facilities. When the message operation is prohibited by the authorization facility, it is not initiated at the message device.

If the information supplied by the program passes certain validity tests, command information from the message-command block is passed to the message device.

A message operation invokes three levels of participation:

The CPU is busy for the duration of SEND MESSAGE instruction.

The subchannel is busy for a new SEND MESSAGE from the passing of the message-operation-block information until status indications are withdrawn or made pending at the subchannel.

The message device is busy while executing the command.

The message device provides response information summarizing the result of the operation. The response information is stored in the message-response block If no unusual status condition is recognized during the performance of the send function, the subchannel is placed in the idle state. Otherwise, status indications are preserved at the subchannel until cleared by TEST SUBCHANNEL.

The SEND MESSAGE instruction is performed with the associated message device. This occurs asynchronously to SEND MESSAGE when the asynchronous (A) bit in the message command block is one. Otherwise, the send function is synchronous to SEND MESSAGE.

A second operand address in SEND MESSAGE designates the message-operation block (MOB) shown in FIG. 7.

The execution parameters contained in the message-operation block are placed at the subchannel. The send function is indicated at the subchannel.

When the A bit in the message-operation block is one, the channel subsystem is signalled to asynchronously perform the send function. Otherwise, the send function is performed during the execution of the instruction.

Condition code 0 is set when the actions for SEND MESSAGE have been taken. The condition codes mentioned herein are the well known condition codes described in the aforementioned Enterprise Systems Architecture/390 Principles of Operations.

Performing the send function consists of making an authorization test, selecting a path of communication, executing a command specified by the program and storing response information in main storage.

The subchannel is placed in the idle state when no unusual status condition is recognized while performing send function. Otherwise, the subchannel is made status-pending and remains in that state until the status condition is cleared by a TEST SUBCHANNEL instruction or a CLEAR MESSAGE instruction.

Condition code 1 is set and no other action is taken if the subchannel is status-pending when SEND MESSAGE is executed.

Condition code 2 is set and no other action is taken if a send function is in progress at the subchannel.

The message-operation block (MOB) is shown in FIG. 7. The message-operation block is the operand of SEND MESSAGE, and specifies control values shown in the format of FIG. 7.

The control parameters and command information are as follows:

ASYNCHRONOUS (A): When the A bit is one, the send function is performed asynchronously to SEND MESSAGE. When the A bit is zero, the send function is performed synchronous to SEND MESSAGE.

NOTIFICATION (N): When the N bit is one, the list-notification bit designated in the list-notification token and LNEN field is used to signal the program the operation is completed. The list-notification token and LNEN are ignored when the N bit is zero. The asynchronous (A) bit must be one when the N bit is one.

LOGICAL-PATH MASK (LPM): When the path bit at the subchannel indicates that a channel path is used for communication, the LPM specifies which of channel paths are logically available. Each bit of the LPM corresponds, by relative bit position, with a CHPID in known subchannel-information block the (SCHIB) see FIG. 13. A bit setting of one means that the corresponding channel path is logically available; a zero means that it is not. When a channel path is logically unavailable, it is not used to perform the send function.

COMMAND LENGTH: Specifies the number of meaningful bytes in the message-command block.

AUTHORIZATION INDEX (AX): An unsigned binary integer that designates an authorization-vector element.

When the authorization index in nonzero, authority to initiate the operation is tested by using the index. When the authorization index is zero, no authorization test is performed.

MESSAGE-BUFFER-ADDRESS-LIST (MBAL) ADDRESS:

Designate the location in storage of the message-buffer address list.

MBAL LENGTH: Specifies the number of message-buffer address words in the message-buffer address list.

The asynchronous bit must be one when the MBAL length is greater than one.

MESSAGE-BUFFER LENGTH: Specifies the number of 256-byte blocks in each message buffer.

MESSAGE-COMMAND-BLOCK ADDRESS: Designates the location in storage of the message-command block.

LIST-NOTIFICATION TOKEN: Designates a list-notification vector. The list-notification token is disclosed in the aforementioned U.S. patent application Ser. No. 07/860,797.

LIST-NOTIFICATION ENTRY NUMBER (LNEN): Designates a bit in a list-notification vector. The LNEN is an unsigned binary integer.

The message-command block specifies command information and has the format shown in FIG. 8. The command information of FIG. 8 is as follows:

COMMAND CODE: The command code specifies the operation to be performed.

Write (W) Indicator: A write operation is performed when the W bit is one and the MBAL and buffer lengths are both nonzero-values are transferred from the message buffers to the message device.

A read operation is performed when the W bit is zero and the MBAL and buffer lengths are both nonzero-values are transferred from the message device to the message buffers.

No read or write operation is performed when the MBAL length or the buffer length is zero.

COMMAND INFORMATION: values needed to complete the specification of the command start.

Figure 9:
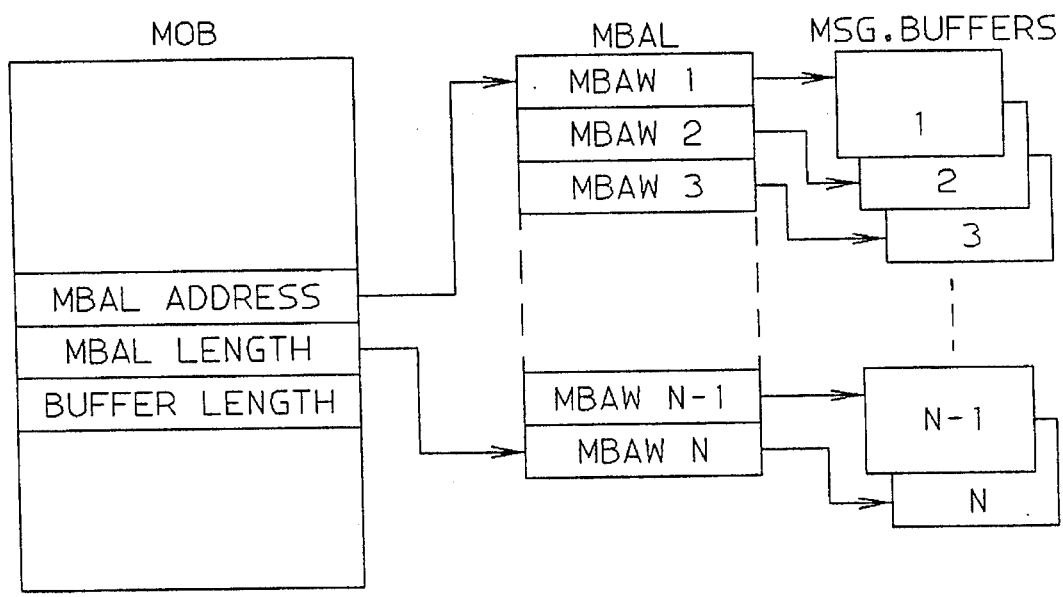
FIG. 9 is a diagram which shows the relationship of the MOB of FIG. 7 and a message-buffer address list (MBAL)

The message-buffer address list (MBAL) of FIG. 9 is made up of message-buffer address words (MBAWs). The number of MBAWs (N) in the list is specified in the MBAL-length field of the message-operation block.

A message-buffer-address word designates a message buffer. The buffer size is specified in the buffer-length field of the message-operation block.

The relationship for the MOB to the MBAL and to the message buffers is also shown in FIG. 9.

Message Buffers:

A message-buffer address list (MBAL) is a series of message-buffer address words (MBAWs), each of which contains a real or absolute address designating a message buffer.

The number of buffers used in the message operation is specified in the MBAL-length field of the message-operation block.

The length of each buffer is a program-specified multiple of 256 bytes. The number of 256-byte blocks in the buffer is given in the buffer-length field of the message-operation block. The buffer is contained entirely within one page frame.

When the send function is performed, the message buffers are accessed according to the order given in the message-buffer address list.

Data transfer occurs between the message device and message buffers in main storage. Data recorded at a message processor is divided into blocks. The length of a block depends on the capabilities of the message processor. The maximum amount of information that can be transferred in a message operation is one block.

The message operation is terminated when the message-buffer area is exhausted or the end of the block is reached, whichever occurs first.

The main-storage data area used for a message operation is defined by a list of message-buffer address words (MBAWs).

The address of the first MBAW used for the operation is contained in the MBAL-address field of the message-operation block. The number of message buffers that are used is specified in the MBAL-length field of the message-operation block.

Each MBAW contains the address of the first byte of a message buffer. The number of consecutive bytes in the buffer is specified by the buffer-length field in the message-operation block. The buffer may contain any multiple of 256 bytes up to 4,096 bytes.

Storage locations are used in ascending order of addresses. As information is transferred to or from main storage, the message-buffer address from the MBAW is incremented and the count from the buffer-length field is decremented. When the count reaches 0, the area defined by the MBAW is exhausted.

When the MBAL length or the buffer length is zero, no message buffers are used for the operation.

When the channel subsystem completes the transfer of information to or from the buffer specified by an MBAW, it can continue the operation by fetching a new MBAW. Fetching a new MBAW is called chaining, and the MBAWs belonging to such a sequence are said to be chained.

Chaining takes place between MBAWs located in successive doubleword locations in storage. It proceeds in an ascending order of addresses; the address of the new MBAW is obtained by adding 8 to the address of the current MBAW.

During chaining, the new MBAW fetched by the channel subsystem defines a new message buffer for the operation. When data transfer for the current MBAW is completed, chaining causes the operation to continue, using the storage area designated by the new MBAW.

MBAWs may be prefetched before they are needed by the channel subsystem in performing the operation.

During a write operation, the channel subsystem may fetch data from the message buffers before the device requests the data. Any number of bytes from any of the buffers designated in the MBAWs may be prefetched.

For a read operation, the values in bytes of the message buffer that are spanned by the data count stored in the message-response block are provided by the device. Zero values may be stored in any other bytes of the message buffer.

For a read operation, the values stored in the message buffers are meaningful when status is withdrawn and the subchannel is placed in the idle state to complete the send function. The contents of the message buffer are undefined when the subchannel is made status-pending to complete the send function.

Each message-buffer address word (MBAW) MBAW contains an address designating a buffer area within a main-storage page frame.

Figure 10:
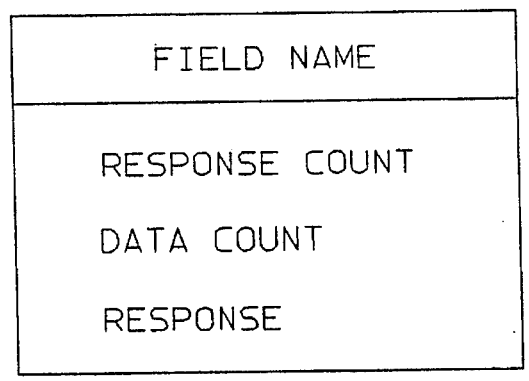
FIG. 10 is the format of a message-response block (MRB)

FIG. 10 shows the message-response block. Information describing the result of command execution is stored in the message-response block. The response information and indications of the message-response block of FIG. 10 are as follows:

RESPONSE COUNT: Specifies the number of meaningful bytes stored in the message-response block. The response count is an unsigned binary integer.

DATA COUNT: Specifies the number of 256-byte blocks stored in the message buffers. The data count is an unsigned binary integer in the range 0–256; it is no larger than the product of the MBAL-length and message-buffer-length values in the message-operation block.

The data count is stored as zeros when the write (W) bit in the message-command block is one.

RESPONSE: Information summarizing the result of the operation is stored. The response field is meaningful whenever the response count is meaningful and has a nonzero value. Otherwise, the contents of the response field are undefined.

The values in the message-response block are meaningful when status is withdrawn and the subchannel is placed in the idle state at the completion of the send function. The values in the message-responses block are undefined when the subchannel is made status-pending at the completion of the send function.

When the device provides an end signal and information summarizing the result of the operation, and no status condition is recognized by the channel subsystem while performing the send function, the response count data count, and response information provided by the device are stored in the message-response block, and the subchannel is placed in the idle state.

When a status condition is recognized after the message operation is initiated at the device but before the end signal is received, the device is signaled to quiesce the operation.

The following indications signify to the program that a status condition was recognized after the message operation may have been initiated at the device:

1) The subchannel is status-pending with subchannel condition code 0 indicated.

2) A machine-check interruption occurs for SEND MESSAGE. Then, either (1) the subchannel is status-ending with subchannel condition code 0, send function and channel-control check indicated, or (2) the subchannel is in the idle state.

In either case, the contents of the message-response block are undefined.

The message operation is considered to be initiated at the device when command information has been sent, or may have been sent, on the path chosen for communication, but an end signal or a signal indicating command nullification has not been recognized at the path. For example, busy and command-rejection signals indicate command nullification.

When the notification bit at the subchannel is one (see FIG. 11), actions are taken in the following order to end the operation:

1) Store response information in the message-response block (MRB) when the operation completes according to the command definition; otherwise, the MRB is unchanged.

2) Update the status fields at the subchannel. Place the subchannel in the idle state when the conditions for status withdrawal are met. The contents of the MRB must be observable by the program when the subchannel is made idle.

3) In sequence, reset list-notification vector bit token.L-NEN, and set its vector-summary (S) bit and the global-summary (G) bit.

Steps 2–3 appear to be concurrent in that once step 2 is started, access to the subchannel by TEST SUBCHAN- NEL, STORE SUBCHANNEL, and SEND MESSAGE is prevented until the list-notification bit is reset.

Figure 11:
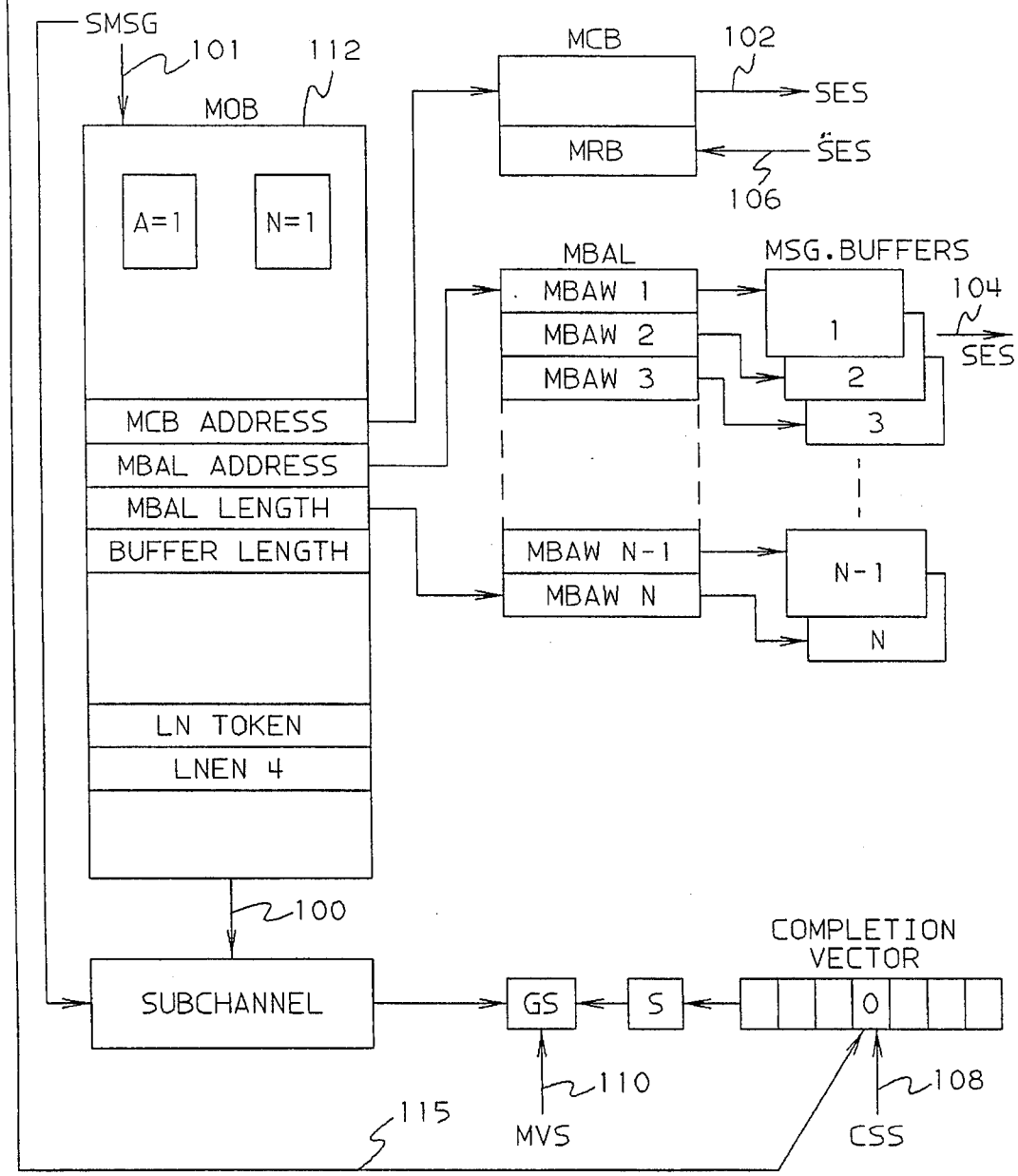
FIG. 11 is a diagram showing the flow of an asynchronous message operation.

A long-running message operation is illustrated in FIG. 11. Four fields in the message-operation block are used:

The asynchronous (A) bit controls whether the operation is executed asynchronously or synchronously to SEND MESSAGE.

The notification (N) bit selects the method that signals the end of the operation.

When the N bit is one, a bit in a list-notification vector is reset to end the operation. A token value designates the list-notification vector, and a list-notification entry number (LNEN) locates one of its bits.

Figure 12:
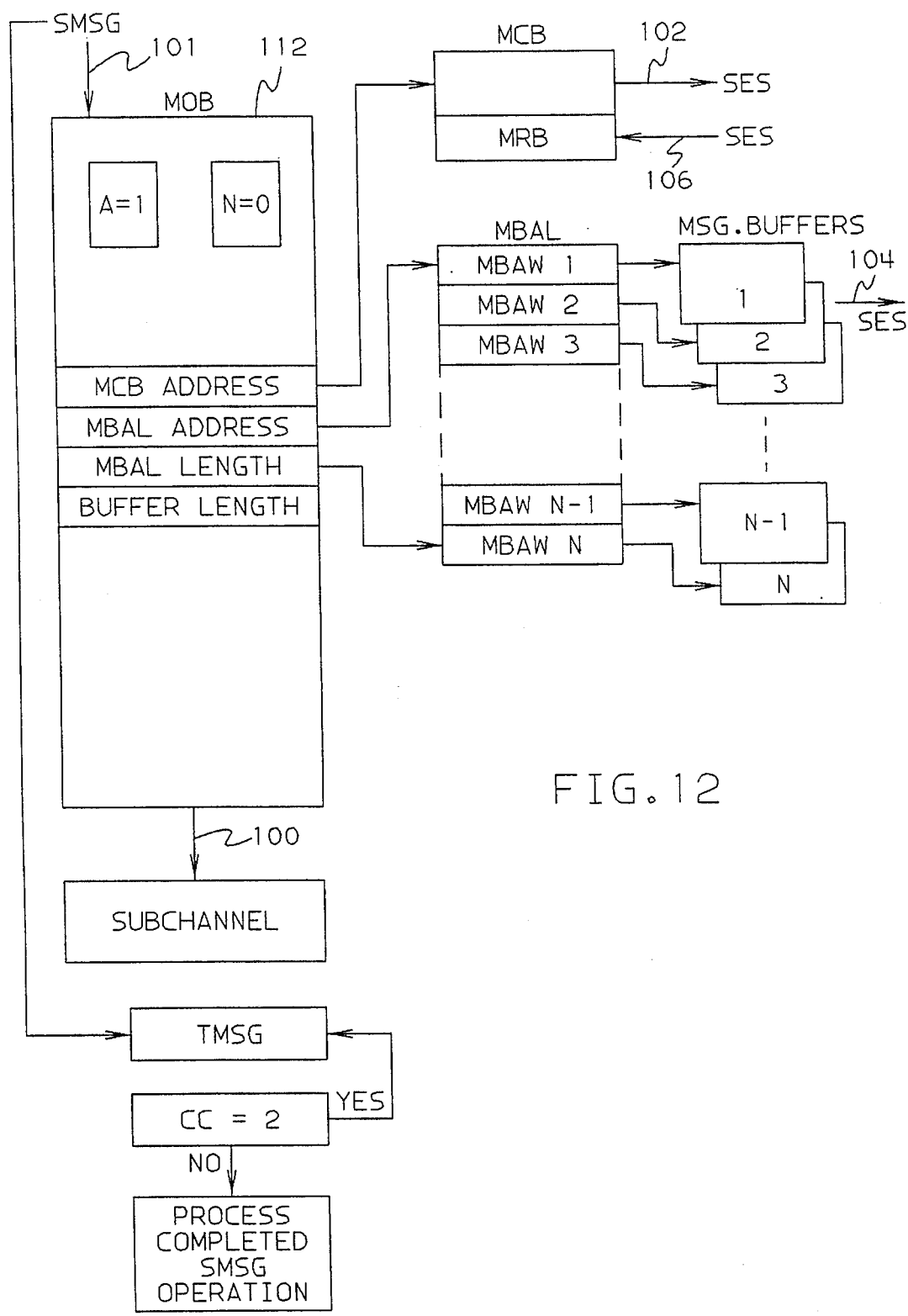
FIG. 12 is a portion of the diagram of FIG. 10 and shows the use of a TEST MESSAGE initiated by a SEND MESSAGE instruction.

When the N bit is zero (see FIG. 12), the operation is complete when the subchannel is made idle or status-pending.

The actions which take place during an asynchronous message operation as shown in FIG. 11, will not be discussed.

The program maps subchannel to list-notification vector bits. It sets the bit designated by the list-notification token and the LNEN value to one at 115, and it stores the token and LNEN values in the message-operation block at 112, before issuing SEND MESSAGE. This is done because the message operation may be completed before the next sequential instruction is initiated.

When SEND MESSAGE is issued at 101, the contents of the message-operation block (MOB) are stored at the designated subchannel at 100. The program requests that the operation be performed asynchronously to SEND MESSAGE (A=1) and that a list-notification vector bit be reset at the end of the operation (N=1).

The contents of the message-command block (MCB) are sent to SES at 102. SES performs the command specified in the MCB, transferring of data along the way at 104.

The operation ends in one of two ways:

Normal Ending: When the operation is performed according to the command definition, information describing the result is stored in the message-response block (MRB) at 106 and the subchannel is placed in the idle state.

Suppression or termination: When the channel subsystem recognizes a condition requiring suppression or termination of the operation, the subchannel is made status-pending with appropriate status indicated. This occurs, for example, when a fencing action is taken on the subchannel.

In either case, the list-notification vector bit specified by token LNEN is reset by the channel subsystem (CSS) at 108, and the summary bit (S) for the vector and the global summary bit (GS) are set.

MVS, in the normal course of events, discovers that bit token. LNEN is zero (see FIG. 14). TEST SUBCHANNEL is used to determine the subchannel state:

When CC=0 is set, the contents of the MRB are valid.

When CC=1 is set, the status information at the subchannel is inspected. The contents of the MRB are not valid.

TEST MESSAGE:

The state of the designated message subchannel at TEST MESSAGE is indicated in the condition code.

Condition code 0 is set when the subchannel is idle.

Condition code 1 is set when the subchannel is status-pending.

Condition code 2 may be set if another CPU or Channel Subsystem is accessing the subchannel when the instruction is executed.

Condition code 2.is set when a message function is active at the subchannel, but the subchannel is not status-pending.

TEST MESSAGE (TMSG) normally does not perform a serialization or a checkpoint-synchronization action. TEST MESSAGE is used to test for completion of an operation that is initiated using SEND MESSAGE.

TEST SUBCHANNEL is issued to clear the status at the subchannel only if condition code 1 is set for TEST MESSAGE. TEST SUBCHANNEL is not issued when condition code 0, 2, or 3 is set for TEST MESSAGE.

CLEAR MESSAGE:

The designated subchannel is cleared, the current send function, if any, is terminated at the subchannel, and the channel subsystem is signaled to asynchronously perform the clear function at the subchannel.

The subchannel is made no longer status-pending. Any functions in progress, as indicated in the function-control field of the known subchannel-status word (SCSW), are cleared, except for the clear function that is performed because of the execution of the instruction.

The channel subsystem is signaled to asynchronously perform the clear function.

Condition code 0 is set to indicate that the actions outlined above have been taken.

The SCSW stored when the status is cleared by TEST SUBCHANNEL has the clear-function bit set to one.

Clear Function:

The clear function is performed subsequent to the execution of CLEAR MESSAGE. Performing the clear function consists in taking the following steps:

1) Selecting a path for the clear signal,

2) Issuing the clear signal, and

3) Making the subchannel status-pending to indicate the completion of the function.

Clear-Function Path Selection:

Path selection is performed to choose a message path on which to issue the clear signal. If the channel subsystem is communicating on a message path with the device while performing a send function, that path is chosen. Otherwise, no path is chosen.

Communication with the device is considered to be in progress if command information has been sent, or may have been sent, to the device, but neither of the following has been recognized at the path used for communication: an end signal or a command-nullification signal.

CLEAR SIGNAL:

The clear signal is issued when conditions warrant. The conditions and their effect on the clear function are described next.

No attempt to issue the clear signal: The clear signal is not issued if no message path is chosen for communications.

Clear signal issued:

The channel subsystem determines that the clear signal was successful when it receives the anticipated response from the message device.

Clear-Function Completion:

The subchannel is made status-pending at the completion of the clear function.

When the subchannel is made status-pending any operation with the device has been terminated at the subchannel, and the clear function is complete.

Information present at the subchannel controls how the message function is performed. This information is communicated to the program in the subchannel-information block (SCHIB), see FIG. 13.

The known PATH-MANAGEMENT-CONTROL WORD (PMCW) of the SCHIB indicates whether the subchannel is a valid message subchannel.

Conditions that must be presented to the program are called status conditions. Status conditions occur during the performance of a message function. They are indicated in a interruption-response block that is stored by TEST SUB-CHANNNEL. The status conditions do not cause an I/O interruption.

When a status condition is recognized while performing a message function, it is indicated at the subchannel. The status indication remains at the subchannel until the status is withdrawn or is cleared by TEST SUBCHANNEL, CLEAR MESSAGE or subsystem reset. The TEST SUBCHANNEL command is well understood and is explained in the aforementioned Enterprise Systems Architecture/390 Principles of Operation.

The performance of the message function has been concluded and information transfer for the operation is complete when the subchannel is placed in the status-pending or idle state.

The known subchannel-status word (SCSW) provides indications describing the status of a subchannel. The SCSW is stored when TEST SUBCHANNEL designates an operation subchannel. The SCSW is placed in words 0–2 of the interruption-response block (IRB) shown in FIG. 13. The IRB is the operand of the TEST SUBCHANNEL instruction. When STORE SUBCHANNEL is executed, the SCSW is stored in the subchannel-information block.

Conditions recognized at a message path when a send function is performed cause status indications to be made available to the program. The conditions are mapped to values in the fields of the SCSW, known channel-report word (CRW) and channel-path-status to ensure the proper program reaction to each condition.

The fields that are used to indicate message-path conditions are:

The subchannel-condition-code, interface control check (IFCC) bit, and the channel control check (CCC) bit in the SCSW.

The reporting-source code and error-recovery code in the CRW.

The bits corresponding to channel paths for messages in the channel-path-status word.

The CRW, IFCC bit and CCC bit are also well understood in the art and are explained in the aforementioned Principles of Operation.

When the send-function and status-pending bits in the SCSW are both one, the subchannel condition code (SCC) indicates the reason that the subchannel was status-pending when the SCSW was stored.

Subchannel condition code 0 is set along with send function when the operation was initiated, or may have been initiated, at the message device. Program recovery actions are taken when the values in the SCSW indicate that the expected result was not achieved.

When the SCSW indicates status-pending and subchannel condition code 0, the contents of the message-response block are not valid. The operation may or may not have been performed by the device. If it was performed, it may or may not have achieved the expected result.

The subchannel condition code, if not zero, indicates the conditions that precluded initiation of the operation at the message device.

Subchannel condition code 2 is set when the send function was terminated because of path-busy conditions. Subchannel condition code 2 results from temporary causes, and the program may retry the operation.

Subchannel condition code 3 is set when the send function was terminated because no paths were available for selection or because the device appeared not operational on the path chosen for communication.

When the device appears not operational on the path chosen, then the not-operational path is designated in the known last path used mask (LPUM). When other paths to the device are operational, the program retries the operation after changing the known logical-path mask (LPM) bit for the not-operational path.

If no channel paths are available for selection, the LPUM is set to zeros. The program can no longer access the device, so it terminates any activities requiring use of the device.

System performance may be degraded if the LPM is not used to make logically not available channel paths for which not-operational conditions have been indicated. The program modifies the LPM before executing other SEND MESSAGE instructions.

Serialization for Message Operations:

Serialization for a message operation occurs as follows:

1) All storage accesses and storage-key accesses by the message operation follow the initiation of SEND MESSAGE, as observed by CPUs, channel programs, and other message operations. This includes accesses for the message-operation block, the message-command block, the message-response block, the message-buffer address list, the message buffers, the list-notification vector and its summary bit, and the global list-notification vector summary bit.

2) All storage accesses and storage-key accesses by the message operation are completed, as observed by CPUs, by channel programs, and by other message operations, when subchannel status indicating status-pending is made available to any CPU, or when the status condition has been withdrawn.

The serialization of a message operation does not affect the sequence of storage accesses or storage-key accesses caused by other message operations, by channel programs, or by another CPU program.

FIG. 13 is a diagram showing a portion of the CPC and its connection to the SES facility 16. As previously shown in FIG. 1, the CPC 10 includes I/S channels 18, two of which are shown at 200 and 201 of FIG. 13. The channels 200 and 201 are identified and discussed as message channels. The channels 200 and 201 are connected to the SES facility 16 by I/S links 202 and 203, respectively, which are identified by CHPIDs, in a well known manner. The I/S links 202 and 203 are disclosed in U.S. patent application Ser. No. 07/839,657 filed Feb. 20, 1992 for "Configurable, Recoverable Parallel Bus" by Bartow et al (Attorney Docket No. PO9-91-066) and U.S. patent application Ser. No. 07/839,652 filed Feb. 20, 1992 for "High Performance Intersystem Communications for Data Processing Systems" by Bartow et al. (Attorney Docket No. PO9-91-067), incorporated herein by reference. Shown in the CPC 10 are two programs, program 1 and program 2, which issue SEND MESSAGE instructions to the channels for sending messages from their MCBs to the SES facility 16. Responses are returned from the SES facility 16 to the programs' MRBs and the SEND MESSAGE operations are completed. Subchannels, such as subchannels 206 and 208, direct and monitor the exchange of messages and responses. As previously mentioned, the status of an exchange is kept as status in the subchannel, which status is made available to the program in the SCHIB. If program 1 sends a message to the SES facility 16 using subchannel 206, its status indicates that it cannot be used by any other program until the SEND MESSAGE operation is complete. When the SEND MESSAGE operation is completed normally, the status of the subchannel 206 is withdrawn without an interruption, as described, such that subchannel 206 may be used by program 2.

Figure 14:
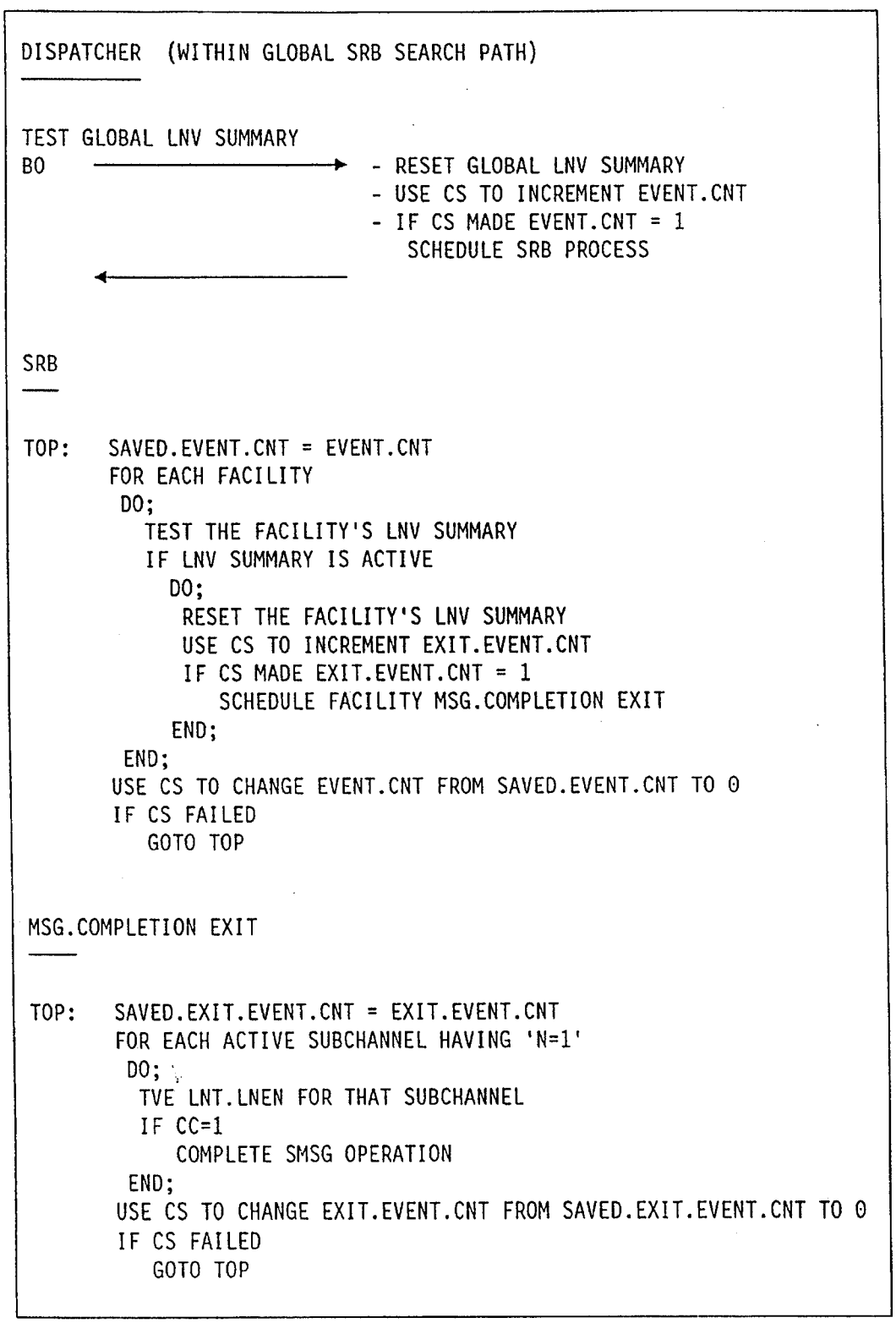
FIG. 14 is a high level logic diagram of a polling routine to determine if a SEND MESSAGE operation has completed.

FIG. 14 shows an MVS polling routine of the completion notification vector to enable MVS to determine that a SEND MESSAGE operation has completed. It is this vector polling which allows a program to know if a SEND MESSAGE operation has completed without an interruption being necessary.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. A multiprocessor data processing system comprising:
    multiple central processing complexes (CPCs), each CPC having a central processor for executing instructions arranged in programs for processing data, main storage for storing said programs and data including state information for the copy of data in that main storage which is shared between that CPC and at least one other CPC, and subchannel means connected to said main storage for performing message operations;
    a structured external storage device for storing state information for data shared between said CPCs;
    multiple message paths, each message path having a first end connected to one of said subchannel means and a second end connected to said structured external storage device for passing, during said message operations, data, messages and responses between the connected subchannel means and said structured external storage device;
    program means in the main storage of each CPC, respectively, each program means having instructions executed by said central processor of the respective CPC for starting a message operation by said subchannel means of the respective CPC for transferring, during said message operations, data, messages and responses between said main storage of the respective CPC and said structured external storage device in a pipelined fashion wherein, during said message operations, said central processor of the respective CPC is enabled to continue executing instructions Of programs of the respective CPC without an interruption for indicating said message operations are completed;
    completion vector means accessible by said subchannel means, said completion vector means having a bit which has a first condition and a second condition;
    said program means having means for setting said bit in its first condition when said program means starts a message operation;
    said subchannel means having means for resetting said bit to its second condition when said subchannel means completes said message operation; and
    said program means includes a completion vector polling means having access to said completion vector means for periodically polling said bit for determining when said bit is in its second condition, thereby indicating said message operation has completed.

2. The data processing system of claim 1 further comprising a program modifiable N bit storage means, the contents of said N bit having a first condition for enabling the use of said completion vector polling means and a second condition for not enabling the use of said completion vector polling means.

3. The data processing system of claim 1 wherein said program means includes means for specifying the completion vector and bit therein to be acted on by said subchannel means when said N bit is in its first condition.

4. The data processing system of claim 1 further comprising;
    status means in said subchannel means, said status means having an idle condition when said subchannel is available for performing message operations and an active condition when said subchannel is not available for performing message operations; and
    status storage means in said main storage and accessible by said subchannel means, said subchannel means having means for storing the condition of said status means in said status storing means such that said programs are able to determine the status condition of said subchannel means.

5. The data processing system of claim 4 further comprising:
    status setting means in said subchannel means connected to said status means, said status setting means for setting the status of said status means to its active condition when a message operation is being performed in said subchannel means such that said subchannel means is not available for message operations.

6. The data processing system of claim 5 further comprising;
    test message means in said program means for testing the status information stored in said status means for determining whether said status means is in its active or idle condition.

7. The data processing system of claim 6 further comprising means for over-indicating the active condition of said status means to said test message means in the presence of concurrent serialized accesses to said status means, such that said test message means does not perform serialization or checkpoint-synchronization actions.

8. The data processing system of claim 4 wherein said status setting means includes send message means for setting the status of said status means in its active condition when a message operation is started in said subchannel means by said program means.

9. The data processing system of claim 8 further comprising:
    clear message means in said program means for performing a clear function thereby terminating the current message operation at said subchannel, said status setting means having means for setting the status of said status means to its active condition when the said clear function is performed.

10. The data processing system of claim 9 wherein said status setting means includes status pending means for setting the status of said status means to a third, status pending condition when said message operation completes in an other than expected manner, wherein said status pending condition indicates said subchannel means is not available for performing message operations.

11. The data processing system of claim 10 further comprising:
    idle status means in said subchannel means connected to said status means, said idle status means for resetting the status of said status means to its idle condition when said data exchange is completed by said subchannel means in an expected manner.

12. The data processing system of claim 11 further comprising:

test message means in said program means for testing the status information stored in said status means for determining if said status means is in one of (1) its active condition as set by said send message means or said clear message means, or (2) its status pending condition as set by said status pending means, or (3) its idle condition as reset by said idle means.

13. The data processing system of claim 11 further comprising serialization means associated with said completion vector means, said status pending means, said idle means and said status means, said serialization means for updating of said bit in said bit vector when said N bit is in its first condition before any status pending or said idle conditions are made in said status means, such that they are concurrently observable to said program.

14. A multiprocessor data processing system comprising:

multiple central processing complexes (CPCs), each CPC having a central processor for executing instructions arranged in programs for processing data, main storage for storing said programs and data including state information for the copy of data in that main storage which is shared between that CPC and at least one other CPC, and subchannel means connected to said main storage for performing message operations for exchanging data, messages and responses with said main storage;

a structured external storage device for storing state information for data shared between said CPCs;

multiple message path, each message path having a first end connected to a different one of said subchannel means and a second end connected to said structured external storage device for passing data, messages and responses between said subchannel means and said structured external storage device;

status means in the subchannel means of each of said CPCs, respectively, said status means having an idle condition when said subchannel of the respective CPC is available for performing message operations and an active condition when said subchannel of the respective CPC is not available for performing message operations;

status testing program means in each of the CPCs, respectively, having instructions executed by said central processor of the respective CPC for testing the condition of the respective status means to determine the status condition of the respective subchannel means thereby determining when a message operation in the respective CPC is completed;

a message control block in said main storage for storing messages to be outputted from said main storage by a send message command executed by said central processor; and a message response block in said main storage for receiving a response inputted into said main responsive to said send message command.

15. The data processing system of claim 14 wherein each of said CPCs further comprises:

status setting means in said subchannel means connected to said status means, said status setting means for setting the status of said status means to its active condition when a message operation is being performed in said subchannel means such that said subchannel means is not available for message operations.

16. The data processing system of claim 15 further comprising;

test message program means having instructions executed by said central processor for testing the status information stored in said status means for determining whether said status means is in its active or idle condition.

17. The data processing system of claim 15 further comprising means for over-indicating the active condition of said status means to said test message means in the presence of concurrent serialized accesses to said status means, such that said test message means does not perform serialization or checkpoint-synchronization actions.

18. The data processing system of claim 15 wherein said status setting means includes send message means for setting the status of said status means in its active condition when a message operation is started in said subchannel means by said program means.

19. The data processing system of claim 18 further comprising:

clear message means in said program means for performing a clear function thereby terminating the current message operation at said subchannel, said status setting means having means for setting the status of said status means to its active condition when the said clear function is performed.

20. The data processing system of claim 19 wherein said status setting means includes status pending means for setting the status of said status means to a third, status pending condition when said message operation completes in an other than expected manner, wherein said status pending condition indicates said subchannel means is not available for performing message operations.

21. The data processing system of claim 19 further comprising:

idle status means in said subchannel means connected to said status means, said idle status means for resetting the status of said status means to its idle condition when said data exchange is completed by said subchannel means in an expected manner.

22. The data processing system of claim 21 further comprising:

status storage means in said main storage for storing the status information in said status means such that said status information, including one of (1) its active condition as set by said send message means or said clear message means, or (2) its status pending condition as set by said status pending means, or (3) its idle condition as reset by said idle means, is accessible to said programs in said main storage.

23. The data processing system of claim 22 wherein said status storage means is a subchannel information block means in said main storage; and further comprising:

store subchannel instruction means in said main storage and executable by said central processor for storing the status information of said subchannel, including the status of said status means, in said subchannel information block means.

24. The data processing of claim 22 wherein said status storage means is an interrupt response block in said main storage; and further comprising:

test subchannel instruction means in said main storage and executable by said central processor for storing the status information of said subchannel, including the status of said status means, in said interrupt response block.

25. A multiprocessor data processing system comprising:

multiple central processing complexes (CPCs), each CPC having a central processor for executing instructions arranged in programs for processing data, said instructions including send message instructions for sending messages, main storage for storing said programs and data including state information for the copy of data in that main storage which is shared between that CPC and at least one other CPC, and subchannel means connected to said main storage for performing message operations;

a structured external storage device for storing state information for data shared between said CPCs;

multiple message paths, each message path having a first end connected to a different subchannel means and a second end connected to said structured external storage device for passing data, messages and responses between said subchannel means and said structured external storage device;

said messages being sent over said message path from one of said central processors to said structured external storage device as a result of said send message instruction, each message having means for including a command to be executed by said structured external storage device, said command for operating on the state information for shared data stored in said structured external device, and a program modifiable A bit having first condition if the command is to be executed synchronously with the central processor sending the message and a second condition if the command is to be executed asynchronously with the central processor sending the message;

completion vector means accessible by said subchannel means, said completion vector means having a completion bit which has a first condition and a second condition;

program means having means for setting said completion bit in its first condition when said program means starts a message operation;

said subchannel means having means for resetting said completion bit to its second condition when said subchannel means completes said message operation; and said program means includes a completion vector polling means having access to said completion vector means for periodically polling said completion bit for determining when said completion bit is in its second condition, thereby indicating said message operation has completed.

26. The data processing system of claim 25 further comprising a program modifiable N bit storage means, the contents of said N bit having a first condition for enabling the use of said notification vector polling means and a second condition for not enabling the use of said notification vector polling means.

27. The data processing system of claim 25 wherein said program means includes means for specifying the completion vector and bit therein to be acted on by said subchannel means when said N bit is in its first condition.

28. The data processing system of claim 25 further comprising;

status means in said subchannel means, said status means having an idle condition when said subchannel is available for performing message operations and an active condition when said subchannel is not available for performing message operations; and status storage means in said main storage and accessible by said subchannel means, said subchannel means having means for storing the condition of said status means in said status storing means such that said programs are able to determine the status condition of said subchannel means.

29. The data processing system of claim 28 further comprising:

status setting means in said subchannel means connected to said status means, said status setting means for setting the status of said status means to its active condition when a message operation is being performed in said subchannel means such that said subchannel means is not available for message operations.

30. The data processing system of claim 29 further comprising;

test message means in said program means for testing the status information stored in said status means for determining whether said status means is in its active or idle condition.

31. The data processing system of claim 30 further comprising means for over-indicating the active condition of said status means to said test message means in the presence of concurrent serialized accesses to said status means, such that said test message means does not perform serialization or checkpoint-synchronization actions.

32. The data processing system of claim 28 wherein said status setting means includes send message means for setting the status of said status means in its active condition when a message operation is started in said subchannel means by said program means.

33. The data processing system of claim 32 further comprising:

clear message means in said program means for performing a clear function thereby terminating the current message operation at said subchannel, said status setting means having means for setting the status of said status means to its active condition when the said clear function is performed.

34. The data processing system of claim 33 wherein said status setting means includes status pending means for setting the status of said status means to a third, status pending condition when said message operation completes in an other than expected manner, wherein said status pending condition indicates said subchannel means is not available for performing message operations.

35. The data processing system of claim 34 further comprising:

idle status means in said subchannel means connected to said status means, said idle status means for resetting the status of said status means to its idle condition when said data exchange is completed by said subchannel means in an expected manner.

36. The data processing system of claim 35 further comprising:

test message means in said program means for testing the status information stored in said status means for determining if said status means is in one of (1) its active condition as set by said send message means or said clear message means, or (2) its status pending condition as set by said status pending means, or (3) its idle condition as reset by said idle means.

37. The data processing system of claim 35 further comprising serialization means associated with said completion vector means, said status pending means, said idle means and said status means, said serialization means for updating of said bit in said bit vector when said N bit is in its first condition before any status pending or said idle conditions are made in said status means, such that they are concurrently observable to said programs.

38. The data processing system of claim 28 wherein said status storage means is a subchannel information block means in said main storage; and further comprising:

store subchannel instruction means in said main storage and executable by said central processor for storing the status information of said subchannel, including the status of said status means, in said subchannel information block means.

39. The data processing of claim 28 wherein said status storage means is an interrupt response block in said main storage; and further comprising:

test subchannel instruction means in said main storage and executable by said central processor for storing the status information of said subchannel, including the status of said status means, in said interrupt response block.

40. The data processing system of claim 25 wherein each CPC further comprises:

a message control block in said main storage for storing messages to be outputted from said main storage by a send message command executed by said central processor; and a message response block in said main storage for receiving a response inputted into said main storage responsive to said send message command.

41. A multiprocessor data processing system comprising:

multiple central processing complexes (CPCs), each CPC including a central processor for executing instructions arranged in programs for processing data, main storage for storing said programs, operating systems for one or more images, data including data shared between two or more images, and state information for data shared between two or more images in the main storage and shared with other CPCs, input/output (I/O) subchannel means for performing I/O data transfers, intersystem (I/S) subchannel means for performing I/S message operations for transferring data, messages and responses, a message control block in said main storage for storing messages to be outputted from said main storage by a send message command executed by said central processor, a message response block in said main storage for receiving a response inputted into said main storage responsive to said send message command;

a structured external storing (SES) device for storing state information for data shared between images and CPCs;

multiple message paths, at least one message path between the I/S subchannel means in each of said CPCs and said SES facility;

I/O devices for storing data including said shared data;

multiple I/O paths, each I/O path being between selected ones of said I/O devices and the I/O subchannel means of selected ones of said CPCs;

status means in each of said I/S subchannel means, said status means having an idle condition when its I/S subchannel means is available for performing message operations and an active condition when its I/S subchannel means is not available for performing message operation; and each CPC includes program means having instructions executed by its central processor for testing the condition of said status means to determine the status condition of its I/S subchannel means thereby determining when a message operation is completed.

42. The data processing system of claim 41 further comprising:

status setting means in each I/S subchannel means connection to said status means, said status setting means for setting the status of said status means to its active condition when a message operation is being performed in its I/S subchannel means such that its I/S subchannel means is not available for message operations.

43. The data processing system of claim 42 further comprising;

test message program means in each CPC having instructions executed by its central processor for testing the status information stored in said status means for determining whether said status means is in its active or idle condition.

44. The data processing system of claim 43 further comprising means for over-indicating the active condition of said status means to said test message means in the presence of concurrent serialized accesses to said status means, such that said test message means does not perform serialization or checkpoint-synchronization actions.

45. The data processing system of claim 42 wherein said status setting means includes send message means for setting the status of said status means in its active condition when a message operation is started in its I/S subchannel means by said program means.

46. The data processing system of claim 45 further comprising:

clear message means in said program means for performing a clear function thereby terminating the current message operation at said subchannel, said status setting means having means for setting the status of said status means to its active condition when the said clear function is performed.

47. The data processing system of claim 46 wherein said status setting means includes status pending means for setting the status of said status means to a third, status pending condition when said message operation completes in an other than expected manner, wherein said status pending condition indicates said subchannel means is not available for performing message operations.

48. The data processing system of claim 47 further comprising:

idle status means in said subchannel means connected to said status means, said idle status means for resetting the status of said status means to its idle condition when said data exchange is completed by said subchannel means in an expected manner.

49. The data processing system of claim 48 further comprising:

status storage means in each main storage for storing the status information in said status means such that said status information, including one of (1) its active condition as by said send message means or said clear message means, or (2) its status pending condition as set by said status pending means, or (3) its idle condition as reset by said idle means, is accessible to said programs in said main storage.

50. The data processing system of claim 49 wherein said status storage means is a subchannel information block means in the respective main storage, and further comprising:

store subchannel instruction means in each CPC and executable by its central processor for storing the status information of the respective I/S subchannel means, including the status of said status means, in said subchannel information block means.

51. The data processing system of claim 49 wherein said status storage means is an interrupt response block in the respective main storage, and further comprising:

test subchannel instruction means each CPC and executable by its central processor for storing the status information of the respective I/S subchannel means, including the status of said status means, in said interrupt response block.

52. A multiprocessor data processing system comprising: multiple central processing complexes (CPCs), each CPC including a central processor for executing instructions arranged in programs for processing data, main storage for storing said programs, operating systems for one or more images, data including data shared between two or more images, and state information for data shared between two or more images in the main storage and shared with other CPC, input/output (I/O) subchannel means for performing I/O data transfers, intersystem (I/S) subchannel means for performing I/S message operations for transferring data, messages and responses, a message control block in said main storage for storing messages to be outputted from said main storage by a send message command executed by said central processor, a message response block in said main storage for receiving a response inputted into said main storage responsive to said send message command;

a structured external storing (SES) device for storing state information for data shared between images and CPCs;

multiple message paths, at least one message path between the I/S subchannel means in each of said CPCs and said SES facility;

I/O devices for storing data including said shared data;

multiple I/O paths, each I/O path being between selected ones of said I/O devices and the I/O subchannel means of selected ones of said CPCs;

wherein said messages being sent over each message path from an I/S subchannel means to said structured external storage device as a result of a send message instruction, each message having means for including a command to be executed by said structured external storage device, said command for operating on the state information for shared data stored in said structured external device, and a program modifiable A bit having a first condition if the command is to be executed synchronously with the sending central processor and a second condition if the command is to be executed asynchronously with the sending central processor.

53. The data processing system of claim 52 further comprising:

completion vector means in each CPC accessible by its I/S subchannel means, said completion vector means having a bit which has a first condition and a second condition;

the program means of the respective CPC having means for setting said bit in its first condition when the respective program means starts a message operation;

each I/S subchannel means having means for resetting said bit to its second condition when said respective I/S subchannel means completes said message operation; and the respective program means includes a completion vector polling means having access to said completion vector means for periodically polling said bit for determining when said bit is in its second condition, thereby indicating said message operation has completed.

54. The data processing system of claim 53 further comprising a program modifiable N bit storage means in each CPC, the contents of said N bit having a first condition for enabling the use of said notification vector polling means and a second condition for not enabling the use of said notification vector polling means.

55. The data processing system of claim 54 wherein the program means of each CPC includes means for specifying the completion vector and bit therein to be acted on by the respective I/S subchannel means when its N bit is in its first condition.

* * * * *

UNITED STATES PATENT AND TRADEMARK OFFICE
CERTIFICATE OF CORRECTION

PATENT NO. : 5,561,809
DATED : Oct. 1, 1996
INVENTOR(S) : David A. Elko et al.

It is certified that error appears in the above-indentified patent and that said Letters Patent is hereby corrected as shown below:

| | |
|---|---|
| Column 23, line 54 | "main" should be --main storage--. |
| Column 28, lines 3-4 | "connection" should be --connected--. |
| Column 29, line 18 | "CPC" should be --CPCs--. |

Signed and Sealed this

Seventh Day of January, 1997

Attest:

BRUCE LEHMAN

*Attesting Officer*     Commissioner of Patents and Trademarks